(12) United States Patent
Swarup et al.

(10) Patent No.: US 12,371,588 B2
(45) Date of Patent: Jul. 29, 2025

(54) LOW TEMPERATURE CURE COATING COMPOSITION

(71) Applicant: PPG Industries Ohio, Inc, Cleveland, OH (US)

(72) Inventors: Shanti Swarup, Allison Park, PA (US); Jose Antonio Camerano, Ludwigsburg (DE); Wolfgang Klaeger, Leonberg (DE); Richard J. Sadvary, Tarentum, PA (US); Beate Seiler, Obersulm (DE); Chad A. Landis, Oakmont, PA (US); Caroline S. Harris, Pittsburgh, PA (US); Tsukasa Mizuhara, Seven Valleys, PA (US); Hongying Zhou, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 752 days.

(21) Appl. No.: 17/633,194

(22) PCT Filed: Aug. 5, 2020

(86) PCT No.: PCT/US2020/044936
§ 371 (c)(1),
(2) Date: Feb. 18, 2022

(87) PCT Pub. No.: WO2021/026192
PCT Pub. Date: Feb. 11, 2021

(65) Prior Publication Data
US 2022/0332973 A1 Oct. 20, 2022

Related U.S. Application Data

(63) Continuation of application No. 16/531,400, filed on Aug. 5, 2019, now abandoned.

(60) Provisional application No. 62/946,160, filed on Dec. 10, 2019.

(51) Int. Cl.
*C09D 175/14* (2006.01)
*C09D 5/00* (2006.01)
*C09D 7/40* (2018.01)

(52) U.S. Cl.
CPC ........... *C09D 175/14* (2013.01); *C09D 5/002* (2013.01); *C09D 7/70* (2018.01)

(58) Field of Classification Search
None
See application file for complete search history.

(56) References Cited

U.S. PATENT DOCUMENTS

| | | |
|---|---|---|
| 4,335,029 A | 6/1982 | Dabi et al. |
| 4,521,460 A | 6/1985 | Dabi et al. |
| 4,650,718 A | 3/1987 | Simpson et al. |
| 4,933,056 A | 6/1990 | Corrigan et al. |
| 5,530,043 A | 6/1996 | Zawacky et al. |
| 5,760,107 A | 6/1998 | Valko et al. |
| 5,814,410 A | 9/1998 | Singer et al. |
| 5,820,987 A | 10/1998 | Kaufman et al. |
| 5,891,981 A | 4/1999 | Mauer et al. |
| 6,316,119 B1 | 11/2001 | Metzger et al. |
| 7,576,157 B2 | 8/2009 | Pajerski |
| 7,619,019 B2 | 11/2009 | Drescher et al. |
| 8,846,156 B2 | 9/2014 | Swarup et al. |
| 9,334,432 B2 | 5/2016 | Zhou et al. |
| 9,522,413 B2 | 12/2016 | Swarup et al. |
| 2002/0103292 A1 | 8/2002 | Blum et al. |
| 2002/0115763 A1 | 8/2002 | Robinson et al. |
| 2003/0220446 A1* | 11/2003 | Faler ............... C08G 18/4854 524/590 |
| 2005/0003093 A1 | 1/2005 | Hesselmans et al. |
| 2006/0047051 A1 | 3/2006 | Ma et al. |
| 2006/0223953 A1 | 10/2006 | Drescher et al. |
| 2011/0009561 A1 | 1/2011 | Pajerski et al. |
| 2011/0070374 A1 | 3/2011 | Ambrose et al. |

(Continued)

FOREIGN PATENT DOCUMENTS

| | | |
|---|---|---|
| CA | 2186776 A1 | 3/1998 |
| CN | 1332776 A | 1/2002 |
| CN | 102232091 A | 11/2011 |
| CN | 104066760 A | 9/2014 |
| CN | 106574136 A | 4/2017 |
| CN | 108350131 A | 7/2018 |
| CN | 108778529 A | 11/2018 |
| CN | 108779351 A | 11/2018 |
| CN | 109642099 A | 4/2019 |
| DE | 1807072 A1 | 5/1970 |
| EP | 0765922 A1 | 4/1997 |
| EP | 1454971 A1 | 9/2004 |
| EP | 2933374 A1 | 10/2015 |

(Continued)

OTHER PUBLICATIONS

Office Action received for Chinese Patent Application No. 202080066759.3, mailed on Jul. 1, 2023, 19 pages (10 pages of English Translation and 9 pages of Original Document).

(Continued)

*Primary Examiner* — Sheeba Ahmed

(57) ABSTRACT

A coating composition includes: an aqueous medium; a first polymer comprising first core-shell particles dispersed in the aqueous medium, where the first core-shell particles include (i) keto and/or aldo functional groups, (ii) a polymeric shell including carboxylic acid functional groups and urethane and/or urea linkages, and (iii) a polymeric core at least partially encapsulated by the polymeric shell, where the polymeric shell and/or the polymeric core include the keto and/or aldo functional groups; a second polymer dispersed in the aqueous medium, the second polymer including carboxylic acid functional groups and hydroxyl functional groups; a first crosslinker including a polyhydrazide reactive with the first core-shell particles; and a second crosslinker reactive with the first core-shell particles and/or the second polymer, where the polymeric core of the first core-shell particles are covalently bonded to at least a portion of the corresponding polymeric shell.

19 Claims, No Drawings

(56) References Cited

U.S. PATENT DOCUMENTS

| | | | |
|---|---|---|---|
| 2011/0245399 | A1 | 10/2011 | Pajerski et al. |
| 2014/0242280 | A1 | 8/2014 | Swarup et al. |
| 2014/0272419 | A1 | 9/2014 | Furar et al. |
| 2014/0377468 | A1 | 12/2014 | Swarup et al. |
| 2015/0005444 | A1 | 1/2015 | Grablowitz et al. |
| 2015/0210883 | A1 | 7/2015 | Swarup et al. |
| 2015/0267077 | A1 | 9/2015 | Janoski et al. |
| 2015/0307738 | A1 | 10/2015 | Schmucker et al. |
| 2016/0002456 | A1 | 1/2016 | Sheerin et al. |
| 2017/0136493 | A1 | 5/2017 | Lamers et al. |
| 2018/0230327 | A1 | 8/2018 | Kanda |
| 2019/0002709 | A1 | 1/2019 | Xu et al. |
| 2019/0085200 | A1* | 3/2019 | Jordan ............... C08G 18/2875 |
| 2019/0085203 | A1 | 3/2019 | Faler et al. |
| 2019/0161640 | A1 | 5/2019 | Gottumukkala et al. |
| 2020/0017712 | A1 | 1/2020 | Steinmetz et al. |
| 2020/0239730 | A1 | 7/2020 | Martin et al. |
| 2020/0290086 | A1 | 9/2020 | Xu et al. |
| 2021/0040350 | A1 | 2/2021 | Swarup et al. |
| 2023/0033514 | A1 | 2/2023 | Wang et al. |

FOREIGN PATENT DOCUMENTS

| | | |
|---|---|---|
| EP | 3708598 A1 | 9/2020 |
| GB | 2089359 A | 6/1982 |
| JP | 2013-221041 A | 10/2013 |
| KR | 10-2016-0149246 A | 12/2016 |
| KR | 10-2018-0113592 A | 10/2018 |
| WO | 2017160398 A1 | 9/2017 |
| WO | 2017180220 A1 | 10/2017 |
| WO | 2018022780 A1 | 2/2018 |
| WO | 2020/003877 A1 | 1/2020 |
| WO | 2020141481 A1 | 7/2020 |
| WO | 2021/119222 A1 | 6/2021 |

OTHER PUBLICATIONS

Non-Final Office Action received for U.S. Appl. No. 16/531,400, mailed on Mar. 25, 2022, 8 pages.
Restriction Requirement received for U.S. Appl. No. 16/531,400, mailed on Dec. 24, 2021, 8 pages.
International Preliminary Report on Patentability received for PCT Patent Application No. PCT/US2020/044936, mailed on Jul. 12, 2021, 3 pages.
International Preliminary Report on Patentability received for PCT Patent Application No. PCT/US2022/064155, mailed on Jun. 23, 2022, 8 pages.
International Search Report and Written Opinion received for PCT Patent Application No. PCT/US2022/064155, mailed on Mar. 9, 2021 11 pages.
Office Action received for Chinese Patent Application No. 202080066759.3, mailed on Oct. 10, 2022, 26 pages (16 pages of English Translation and 10 pages of Original Document).
Office Action received for Korean Patent Application No. 10-2022-7007248 , mailed on Apr. 18, 2024, 12 pages (6 pages of English Translation and 6 pages of Original Document).
International Search Report and Written Opinion received for PCT Application Serial No. PCT/US2020/044936 dated Nov. 16, 2020, 11 pages.
"Water Soluble Polymer," Edited by Yan Ruixuan, 1998.
Fuan. Y. et al., "Synthesis of core-shell structure acrylate emulsion and preparation of wood sealing primer," China Paint, vol. 26, Issue 5, 2011.
Office Action received for Australian Patent Application No. 2020324424, mailed on Feb. 13, 2023 4 pages.
Office Action received for Canadian Patent Application No. 3147080, mailed on Feb. 22, 2023, 4 pages.
Office Action received for Chinese Patent Application No. 202080085711.7, mailed on Feb. 25, 2023, 34 pages (21 pages of English Translation and 13 pages of Original Document).
Office Action received for Japanese Patent Application No. 2022-507409, mailed on Feb. 14, 2023, 3 pages.
Office Action received for Australian Patent Application No. 2020324424, mailed on Jun. 2, 2023, 4 pages.
Ming. Z. et al., "manufacture of acrylic resin equipment and their use in coatings Application and research status," Shanghai Paint, Issue 07, 2007, pp. 88.
Office Action received for Chinese Patent Application No. 202080085711.7, mailed on Aug. 4, 2023, 18 pages (10 pages of English Translation and 8 pages of Original Document).
Bullermann et al, Synthesis and Characterization of Polyurethane Ionomers with Trimellitic Anhydride and Dimethylol Propionic Acid for Waterborne Self-Emulsifying Dispersions, Journal of Polymer Science: Polymer Chemistry, vol. 52, Issue 5, p. 680-690 (Year: 2014).
National Center for Biotechnology Information (2024). PubChem Compound Summary for CID 444972, Fumaric Acid. Retrieved Nov. 25, 2024 from https://pubchem.ncbi.nlm.nih.gov/compound/Fumaric-Acid. (Year: 2024).
WO 2020003877A1 machine translation (Year: 2019).
Occupational Safety and Health Administration, OSHA Fact Sheet: Formaldehyde, 2011, p. 1-2 (Year: 2011).

* cited by examiner

LOW TEMPERATURE CURE COATING COMPOSITION

FIELD OF THE INVENTION

The present invention relates to a coating composition including, a substrate coated therewith, and multi-layer coatings derived therefrom.

BACKGROUND OF THE INVENTION

Coating compositions are applied to a wide variety of substrates and cured to form a coating to provide color and other visual effects, corrosion resistance, abrasion resistance, chemical resistance, and the like. With respect to coatings over automotive substrates, multiple coating layers may be included, and the multi-layer coating may include a primer layer and primer surface layer. Generally, each layer of the multi-layer coating is separately dehydrated and/or cured under varying conditions such as at different temperatures to form the final multi-layer coating.

SUMMARY OF THE INVENTION

The present invention relates to a coating composition including: an aqueous medium; a first polymer including first core-shell particles dispersed in the aqueous medium, where the first core-shell particles include (i) keto and/or aldo functional groups, (ii) a polymeric shell including carboxylic acid functional groups and urethane and/or urea linkages, and (iii) a polymeric core at least partially encapsulated by the polymeric shell, where the polymeric shell and/or the polymeric core include the keto and/or aldo functional groups; a second polymer dispersed in the aqueous medium, the second polymer including carboxylic acid functional groups and hydroxyl functional groups; a first crosslinker including a polyhydrazide reactive with the first core-shell particles; and a second crosslinker reactive with the first core-shell particles and/or the second polymer, where the polymeric core of the first core-shell particles are covalently bonded to at least a portion of the corresponding polymeric shell.

The present invention also relates to a multi-layer coating including: a first basecoat layer applied over at least a portion of a substrate which is formed from a first basecoat composition; and a second basecoat layer applied over at least a portion of the first basecoat composition and which is formed from a second basecoat composition, where the first basecoat composition and/or the second basecoat composition includes: an aqueous medium; a first polymer including first core-shell particles dispersed in the aqueous medium, where the first core-shell particles include (i) keto and/or aldo functional groups, (ii) a polymeric shell including carboxylic acid functional groups and urethane and/or urea linkages, and (iii) a polymeric core at least partially encapsulated by the polymeric shell, where the polymeric shell and/or the polymeric core include the keto and/or aldo functional groups; a second polymer dispersed in the aqueous medium, the second polymer including carboxylic acid functional groups and hydroxyl functional groups; a first crosslinker including a polyhydrazide reactive with the first core-shell particles; and a second crosslinker reactive with the first core-shell particles and/or the second polymer, where the polymeric core of the first core-shell particles are covalently bonded to at least a portion of the corresponding polymeric shell.

DESCRIPTION OF THE INVENTION

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses the singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" coating, "a" core-shell particle, and the like refer to one or more of any of these items. Also, as used herein, the term "polymer" is meant to refer to prepolymers, oligomers, and both homopolymers and copolymers. The term "resin" is used interchangeably with "polymer".

As used herein, the transitional term "comprising" (and other comparable terms, e.g., "containing" and "including") is "open-ended" and open to the inclusion of unspecified matter. Although described in terms of "comprising", the terms "consisting essentially of" and "consisting of" are also within the scope of the invention.

The present invention is directed to a coating composition which includes: (1) an aqueous medium; (2) a first polymer comprising first core-shell particles dispersed in the aqueous medium, wherein the first core-shell particles comprise (i) keto and/or aldo functional groups, (ii) a polymeric shell comprising carboxylic acid functional groups and urethane and/or urea linkages, and (iii) a polymeric core at least partially encapsulated by the polymeric shell, wherein the polymeric shell and/or the polymeric core may comprise the keto and/or aldo functional groups; (3) a second polymer dispersed in the aqueous medium, the second polymer comprising carboxylic acid functional groups and hydroxyl functional groups; (4) a first crosslinker comprising a polyhydrazide reactive with the first core-shell particles (2); and (5) a second crosslinker reactive with the first core-shell particles (2) and/or the second polymer. The polymeric core of the first core-shell particles (2) are covalently bonded to at least a portion of their corresponding polymeric shell.

As used herein, the "aqueous medium" refers to a liquid medium comprising at least 50 weight percent water, based on the total weight of the liquid medium. Such aqueous liquid media can comprise at least 60 weight percent water, or at least 70 weight percent water, or at least 80 weight percent water, or at least 90 weight percent water, or at least 95 weight percent water, or 100 weight percent water, based on the total weight of the liquid medium. The solvents that, if present, make up less than 50 weight percent of the liquid medium include organic solvents. Suitable organic solvents include polar organic solvents, e.g. protic organic solvents such as glycols, glycol ether alcohols, alcohols, volatile ketones, glycol diethers, esters, and diesters. Other suitable organic solvents include aromatic and aliphatic hydrocarbons. The coating composition may comprise from 30-50 weight percent solids, such from 35-45 weight percent or 35-40 weight percent solids, with the balance comprising solvent.

The coating composition includes a dispersion of core-shell particles (the dispersed phase) in the aqueous medium (the continuous phase). The core-shell particles comprise a core that is at least partially encapsulated by a shell. A core-shell particle in which the core is at least partially encapsulated by the shell refers to a particle comprising (i) at least a first material that forms the center of the particle (i.e., the core) and (ii) at least a second material (i.e., the shell) that forms a layer over at least a portion of the surface of the first material (i.e., the core). At least a portion of the shell may directly contact at least a portion of the core. Further, the core-shell particles can have various shapes (or morphologies) and sizes. The core-shell particles can have generally spherical, cubic, platy, polyhedral, or acicular (elongated or fibrous) morphologies. The core-shell particles can also have an average particle size of 30 to 300 nanometers, or from 40 to 200 nanometers, or from 50 to 150 nanometers. As used herein, "average particle size" refers to volume average particle size. The average particle size is determined with a Zetasize 3000HS following the instructions in the Zetasize 3000HS manual.

The core-shell particles described herein may each comprise a polymeric core as well as a polymeric shell. A "polymeric core" means that the core of the core-shell particle comprises one or more polymers and a "polymeric shell" means that the shell of the core-shell particle comprises one or more polymers.

The first polymer of the coating composition comprises first core-shell particles. The polymeric core of the first core-shell particles can comprise a (meth)acrylate polymer, a vinyl polymer, or a co-polymer thereof. As used herein, the term "(meth)acrylate" refers to both the methacrylate and the acrylate. Moreover, the backbone or main chain of a polymer that forms at least a portion of the polymeric shell can comprise urethane and/or urea linkages and, optionally, other linkages. For instance, the polymeric shell can comprise a polyurethane with a backbone that includes urethane linkages and urea linkages. The polymeric shell comprising urea linkages, such as the previously mentioned polyurethane, can also comprise additional linkages including, but not limited to, ester linkages, ether linkages, and combinations thereof.

The polymeric core and/or the polymeric shell of the first core-shell particles can also comprise one or more, such as two or more, reactive functional groups. The term "reactive functional group" refers to an atom, group of atoms, functionality, or group having sufficient reactivity to form at least one covalent bond with another co-reactive group in a chemical reaction. At least some of the reactive functional groups of the first core-shell particles are keto functional groups (also referred to as ketone functional groups), aldo functional groups (also referred to as aldehyde functional groups), or combinations thereof. Typically, the polymeric shell of the first core-shell particles comprise keto functional groups, aldo functional groups, or a combination thereof. Alternatively or additionally, the polymeric core also comprises reactive functional groups such as keto functional groups, aldo functional groups, or combinations thereof. Alternatively, the polymeric core of the first core-shell particles is free of reactive functional groups such as keto functional groups and aldo functional groups.

Suitable reactive functional groups that can be formed on the polymeric shell and/or polymeric core of the first core-shell particles include carboxylic acid groups, amine groups, epoxide groups, hydroxyl groups, thiol groups, carbamate groups, amide groups, urea groups, isocyanate groups (including blocked isocyanate groups), ethylenically unsaturated groups, and combinations thereof. As used herein, "ethylenically unsaturated" refers to a group having at least one carbon-carbon double bond. Suitable ethylenically unsaturated groups include, but are not limited to, (meth)acrylate groups, vinyl groups, and combinations thereof.

The polymeric core and polymeric shell of the first core-shell particles can be prepared to provide a hydrophilic polymeric shell with enhanced water-dispersibility/stability and a hydrophobic polymeric core. As such, the polymeric shell can comprise hydrophilic water-dispersible groups while the polymeric core can be free of hydrophilic water-dispersible groups. The hydrophilic water-dispersible groups can increase the water-dispersibility/stability of the polymeric shell in the aqueous medium so that the polymeric shell at least partially encapsulates the hydrophobic core.

The water-dispersible groups can be formed from hydrophilic functional groups. The polymeric shell comprises carboxylic acid functional groups, such as by using a carboxylic acid group containing diols to form the polymeric shell. The carboxylic acid functional groups can be at least partially neutralized to form a salt (i.e., at least 30 percent of the total neutralization equivalent) by an organic or inorganic base, such as a volatile amine, to form a salt group. Suitable amines include ammonia, dimethylamine, trimethylamine, triethylamine, monoethanolamine, and dimethylethanolamine. It is appreciated that the amines will evaporate during the formation of the coating to expose the carboxylic acid functional groups and allow the carboxylic acid functional groups to undergo further reactions such as with a crosslinking agent reactive with the carboxylic acid functional groups. Other water-dispersible groups that may be present in the polymeric shell of the first core-shell particle include polyoxyalkylene groups.

The polymeric shell of the first core-shell particles may include a polyurethane with pendant and/or terminal keto and/or aldo functional groups as well as pendant and/or terminal carboxylic acid functional groups. As previously described, the carboxylic acid functional groups can be at least partially neutralized (i.e., at least 30 percent of the total neutralization equivalent) by an organic or inorganic base, such as a volatile amine, to form a salt group as previously described. Further, the polymeric core can be a hydrophobic core that is free of such carboxylic acid groups and salt groups formed therefrom. A "pendant group" refers to a group that is an offshoot from the side of the polymer backbone and which is not part of the polymer backbone. In contrast, a "terminal group" refers to a group on an end of the polymer backbone and which is part of the polymer backbone.

The polymeric shell of the first core-shell particles are covalently bonded to at least a portion of the polymeric core. The polymeric shell can be covalently bonded to the polymeric core by reacting at least one functional group on the monomers and/or prepolymers that are used to form the polymeric shell with at least one functional group on the monomers and/or prepolymers that are used to form the polymeric core. The functional groups can include any of the functional groups previously described provided that at least one functional group on the monomers and/or prepolymers that are used to form the polymeric shell is reactive with at least one functional group on the monomers and/or prepolymers that are used to form the polymeric core. For instance, the monomers and/or prepolymers that are used to form the polymeric shell and polymeric core can both comprise at least one ethylenically unsaturated group that are reacted with each other to form a chemical bond. As used herein, a "prepolymer" refers to a polymer precursor capable of further reactions or polymerization by one or more reactive groups to form a higher molecular mass or cross-linked state.

Various components can be used to form the first core-shell particles. The first core-shell particles can for example be formed from isocyanate functional polyurethane prepolymers, polyamines, and ethylenically unsaturated monomers. The isocyanate functional polyurethane prepolymers can be prepared according to any method known in the art, such as by reacting at least one polyisocyanate with one or more compound(s) having functional groups that are reactive with the isocyanate functionality of the polyisocyanate. Reactive functional groups can be active hydrogen-containing functional groups such as hydroxyl groups, thiol groups, amine groups, and acid groups like carboxylic acid groups. A hydroxyl group may react with an isocyanate group to form a urethane linkage. A primary or secondary amine group may react with an isocyanate group to form a urea linkage. Suitable compounds that can be used to form the polyurethane include, but are not limited to, polyols, polyisocyanates, compounds containing carboxylic acids such as diols containing carboxylic acids, polyamines, hydroxyl functional ethylenically unsaturated components such as hydroxyalkyl esters of (meth)acrylic acid, and/or other compounds having reactive functional groups, such as hydroxyl groups, thiol groups, amine groups, and carboxylic acids. The polyurethane prepolymer can also be prepared with keto and/or aldo functional monoalcohols.

Suitable polyisocyanates include isophorone diisocyanate (IPDI), dicyclohexylmethane 4,4'-diisocyanate (H12MDI), cyclohexyl diisocyanate (CHDI), m-tetramethylxylylene diisocyanate (m-TMXDI), p-tetramethylxylylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), toluene diisocyanate (TDI), m-xylylenediisocyanate (MXDI) and p-xylylenediisocyanate, 4-chloro-1,3-phenylene diisocyanate, 1,5-tetrahydro-naphthalene diisocyanate, 4,4'-dibenzyl diisocyanate, and 1,2,4-benzene triisocyanate, xylylene diisocyanate (XDI), and mixtures or combinations thereof.

Suitable polyols that can be used to prepare the polyurethane based polymer include, but are not limited to, lower molecular weight (lower than 2,000 Mn) glycols (Mn was measured by gel permeation chromatography using a polystyrene standard according to ASTM D6579-11 performed using a Waters 2695 separation module with a Waters 2414 differential refractometer (RI detector); tetrahydrofuran (THF) was used as the eluent at a flow rate of 1 ml/min, and two PLgel Mixed-C (300×7.5 mm) columns were used for separation at the room temperature; weight and number average molecular weight of polymeric samples can be measured by gel permeation chromatography relative to linear polystyrene standards of 800 to 900,000 Da), polyether polyols, polyester polyols, copolymers thereof, and combinations thereof. Suitable low molecular weight glycols include ethylene glycol, diethylene glycol, triethylene glycol, 1,2-propylene glycol, 1,3-butylene glycol, tetramethylene glycol, hexamethylene glycol, and combinations thereof, as well as other compounds that comprise two or more hydroxyl groups and combinations of any of the foregoing. Suitable polyether polyols include polytetrahydrofuran, polyethylene glycol, polypropylene glycol, polybutylene glycol, and combinations thereof. Suitable polyester polyols include those prepared from a polyol comprising an ether moiety and a carboxylic acid or anhydride.

Other suitable polyols include, but are not limited to, 1,6-hexanediol, cyclohexanedimethanol, 2-ethyl-1,6-hexanediol, 1,4-butanediol, ethylene glycol, propylene glycol, 1,3-propanediol, 1,4-butanediol, neopentyl glycol, trimethylol propane, 1,2,6-hexantriol, glycerol, and combinations thereof. Further, suitable amino alcohols that can be used include, but are not limited to, ethanolamine, propanolamine, butanolamine, and combinations thereof.

Suitable carboxylic acids, which can be reacted with the polyols to form a polyester polyol, include, but are not limited to, glutaric acid, succinic acid, malonic acid, oxalic acid, phthalic acid, isophthalic acid, hexahydrophthalic acid, adipic acid, maleic acid, and mixtures thereof. Further, suitable acid containing diols include, but are not limited to, 2,2-bis(hydroxymethyl)propionic acid which is also referred to as dimethylolpropionic acid (DMPA), 2,2-bis(hydroxymethyl)butyric acid which is also referred to as dimethylol butanoic acid (DMBA), diphenolic acid, and combinations thereof.

Suitable keto functional monoalcohols include, but are not limited to, hydroxyacetone, 4-hydroxy-2-butanone, 5-hydroxy-4-octanone, 4-hydroxy-4-methylpentan-2-one which is also referred to as diacetone alcohol, 3-hydroxyacetophenone, and combinations thereof. Further, suitable aldo functional monoalcohols include D-lactaldehyde solution, aldol, 4-hydroxy-pentanal, 5-hydroxy-hexanal, 5-hydroxy-5-methylhexanal, 4-hydroxy-4-methyl-pentanal, 3-hydroxy-3-methylbutanal, and combinations thereof.

Suitable hydroxyalkyl esters of (meth)acrylic acid include hydroxymethyl (meth)acrylate, hydroxyethyl (meth)acrylate, hydroxypropyl (meth)acrylate, hydroxybutyl (meth)acrylate, and combinations thereof.

The components that form the polyurethane prepolymer can be reacted in a stepwise manner, or they can be reacted simultaneously. The polyurethane prepolymer can be formed by reacting a diisocyanate, a polyol, a carboxyl group-containing diol, a hydroxyl group-containing ethylenically unsaturated monomer, and, optionally, a keto functional monoalcohol simultaneously.

The polyurethane prepolymers can also be prepared in the presence of catalysts, polymerization inhibitors, and combinations thereof. Suitable catalysts include triethylamine, N-ethyl morpholine, triethyldiamine, and the like, as well as tin type catalysts such as dibutyl tin dilaurate, dioctyl tin dilaurate, and the like. Polymerization inhibitors that can be used to prevent polymerization of the ethylenically unsaturated compounds during formation of the polyurethane include hydroquinone, hydroquinone monomethyl ether, p-benzoquinone, and the like.

As previously mentioned, the first core-shell particles can also be prepared with polyamines and ethylenically unsaturated monomers not incorporated into the polyurethane prepolymer during preparation thereof. For instance, the isocyanate functional polyurethane prepolymers can be prepared as described above and then reacted with polyamines, such as polyhydrazides or other suitable polyamines, as a chain extender. As used herein, a "chain extender" refers to a lower molecular weight (Mn less than 2000) compound having two or more functional groups that are reactive towards isocyanate.

Suitable polyamines that can be used to prepare the polyurethane based polymer include aliphatic and aromatic compounds, which comprise two or more amine groups selected from primary and secondary amine groups, such as, but not limited to, diamines such as ethylenediamine, hexamethylenediamine, 1,2-propanediamine, 2-methyl-1,5-penta-methylenediamine, 2,2,4-trimethyl-1,6-hexanediamine, isophoronediamine, diaminocyclohexane, xylylenediamine, 1,12-diamino-4,9-dioxadodecane, and combinations thereof. The polyamine may include a polyhydrazide, which $NH_2$ groups thereof may be primary amino groups for the Michael addition reaction to introduce keto and/or aldo functional groups onto the polymeric shell, as described hereinafter. Suitable polyamines are also sold by Huntsman Corporation (The Woodlands, TX) under the trade name JEFFAMINE, such as JEFFAMINE D-230 and JEFFAMINE D-400.

Suitable polyamine functional compounds include the Michael addition reaction products of a polyamine functional compound, such as a diamine (e.g., a polyhydrazide), with keto and/or aldo containing ethylenically unsaturated monomers. The polyamine functional compound typically comprises at least two primary amino groups (i.e., a functional group represented by the structural formula —$NH_2$), and the keto and/or aldo containing unsaturated monomers include, but are not limited to, (meth)acrolein, diacetone (meth)acrylamide, diacetone (meth)acrylate, acetoacetoxyethyl (meth)acrylate, vinyl acetoacetate, crotonaldehyde, 4-vinylbenzaldehyde, and combinations thereof. The resulting Michael addition reaction products can include a compound with at least two secondary amino groups (i.e., a functional group represented by the structural formula —NRH in which R is an organic group) and at least two keto and/or aldo functional groups. It is appreciated that the secondary amino groups will react with the isocyanate functional groups of the polyurethane prepolymers to form urea linkages and chains extend the polyurethanes. Further, the keto and/or aldo functional groups will extend out from the backbone of the chain-extended polyurethane, such as from the nitrogen atom of the urea linkage to form a polyurethane with pendant keto and/or aldo functional groups.

After reacting the polyurethane prepolymers and polyamines, the chain extended polyurethane and additional ethylenically unsaturated monomers can be subjected to a polymerization process to form the core-shell particles. The additional ethylenically unsaturated monomers can be added after forming the polyurethane. Alternatively, the additional ethylenically unsaturated monomers can be used as a diluent during preparation of the polyurethane prepolymer and not added after formation of the polyurethane. It is appreciated that ethylenically unsaturated monomers can be used as a diluent during preparation of the polyurethane prepolymer and also added after formation of the polyurethane.

The additional ethylenically unsaturated monomers can comprise multi-ethylenically unsaturated monomers, mono-ethylenically unsaturated monomers, or combinations thereof. A "mono-ethylenically unsaturated monomer" refers to a monomer comprising only one ethylenically unsaturated group, and a "multi-ethylenically unsaturated monomer" refers to a monomer comprising two or more ethylenically unsaturated groups.

Suitable ethylenically unsaturated monomers include, but are not limited to, alkyl esters of (meth)acrylic acid, hydroxyalkyl esters of (meth)acrylic acid, acid group containing unsaturated monomers, vinyl aromatic monomers, aldo or keto containing unsaturated monomers, and combinations thereof.

Suitable alkyl esters of (meth)acrylic acid include methyl (meth)acrylate, ethyl (meth)acrylate, butyl (meth)acrylate, isobutyl (meth)acrylate, ethylhexyl (meth)acrylate, lauryl (meth)acrylate, octyl (meth)acrylate, glycidyl (meth)acrylate, isononyl (meth)acrylate, isodecyl (meth)acrylate, vinyl (meth)acrylate, acetoacetoxyethyl (meth)acrylate, acetoacetoxypropyl (meth)acrylate, and combinations thereof. Other suitable alkyl esters include, but are not limited to, di(meth)acrylate alkyl diesters formed from the condensation of two equivalents of (meth)acrylic acid such as ethylene glycol di(meth)acrylate. Di(meth)acrylate alkyl diesters formed from C2-24 diols such as butane diol and hexane diol can also be used.

Suitable hydroxyalkyl esters of (meth)acrylic acid and keto and aldo containing unsaturated monomers include any of those previously described. Suitable acid group containing unsaturated monomers include (meth)acrylic acid, itaconic acid, maleic acid, fumaric acid, crotonic acid, aspartic acid, malic acid, mercaptosuccinic acid, and combinations thereof.

Suitable vinyl aromatic monomers include styrene, 2,4-dimethylstyrene, ethylstyrene, isopropylstyrene, butylstyrene, vinyl naphthalene, vinyl toluene, divinyl aromatic monomers such as divinyl benzene, and combinations thereof.

As previously noted, the ethylenically unsaturated monomers can be polymerized in the presence of the polyurethane, which can also contain ethylenically unsaturated groups, to form the first core-shell particles. The polymerization can be conducted using art recognized techniques as well as conventional additives such as emulsifiers, protective colloids, free radical initiators, and chain transfer agents known in the art.

The first core-shell particles may be prepared with: (i) ethylenically unsaturated monomers; (ii) polyurethane prepolymers comprising isocyanate functional groups, carboxylic acid functional groups, and ethylenically unsaturated groups; and (iii) the Michael addition reaction product of a diamine and keto and/or aldo containing unsaturated monomers. The resulting core-shell particles comprise a polymeric core prepared from ethylenically unsaturated monomers that is covalently bonded to at least a portion of a polyurethane shell having pendant carboxylic acid functional groups, pendant keto and/or aldo functional groups, urethane linkages, and urea linkages. For enhanced water-dispersibility/stability, the carboxylic acid functional groups on the polymeric shell can be at least partially neutralized (i.e., at least 30 percent of the total neutralization equivalent) by an organic or inorganic base, such as a volatile amine, to form a salt group as previously described. The polymeric core can also include pendant and/or terminal functional groups, such as keto and/or aldo functional groups, by using ethylenically unsaturated monomers that contain additional functional groups. Alternatively, the polymeric core can be free of additional functional groups such as keto and/or aldo functional groups.

The first core-shell particles can be obtained from reactants comprising: ethylenically unsaturated monomers, wherein at least one of the ethylenically unsaturated monomers comprises keto and/or aldo functional groups; and a polyurethane prepolymer comprising an isocyanate functional group, an ethylenically unsaturated group, and carboxylic acid functional groups.

The first core-shell particles can also be prepared with: (i) ethylenically unsaturated monomers; (ii) polyurethane prepolymers comprising isocyanate functional groups, carboxylic acid functional groups, terminal keto and/or aldo functional groups, and ethylenically unsaturated groups; and (iii) a diamine. The resulting core-shell particles comprise a polymeric core prepared from ethylenically unsaturated monomers and a polyurethane shell having pendant carboxylic acid functional groups, terminal keto and/or aldo functional groups, urethane linkages, and urea linkages. For enhanced water-dispersibility/stability, the carboxylic acid functional groups on the polymeric shell can be at least partially neutralized (i.e., at least 30 percent of the total neutralization equivalent) by an organic or inorganic base, such as a volatile amine, to form a salt group as previously described. The polymeric core can also include pendant and/or terminal functional groups, such as keto and/or aldo functional groups, by using ethylenically unsaturated monomers that contain additional functional groups. Alternatively, the polymeric core can be free of additional functional groups such as keto and/or aldo functional groups.

Further, the polymeric core of the first core-shell particles is covalently bonded to at least a portion of the polymeric shell thereof. The polymeric shell of the core-shell particles can be at least partially formed from a chain extended polyurethane prepared from: (a) a first polyurethane prepolymer comprising a terminal isocyanate functional group, pendant carboxylic acid functional groups, and a terminal keto and/or aldo functional group; (b) a second polyurethane prepolymer comprising a terminal isocyanate functional group, pendant carboxylic acid functional groups, and a terminal ethylenically unsaturated group; and (c) a diamine that reacts with both the first and second polyurethane prepolymers. The ethylenically unsaturated monomers can then be polymerized in the presence of the polyurethane to form the polymeric core-shell particles in which the polymeric core is covalently bonded to at least a portion of the polymeric shell.

The first core-shell particles can comprise at least 5 weight percent, such as at least 8 weight percent, at least 20 weight percent, at least 30 weight percent, at least 40 weight percent, at least 50 weight percent, or at least 60 weight percent of the coating composition, based on the total resin solids weight of the coating composition. The first core-shell particles can comprise up to 95 weight percent, such as up to 85 weight percent, up to 75 weight percent, up to 65 weight percent, up to 50 weight percent, or up to 45 weight percent of the coating composition, based on the total resin solids weight of the coating composition. The first core-shell particles can also comprise a range of from 8 to 95 weight percent, such as from 30 to 85 weight percent, from 35 to 65 weight percent, or from 40-60 weight percent of the coating composition, based on the total resin solids weight of the coating composition.

The coating composition comprises a second polymer dispersed in the aqueous medium, the second polymer comprising carboxylic acid functional groups and hydroxyl functional groups. The second polymer may comprise a polyester polymer. The second polymer may comprise second core-shell particles, wherein the second core-shell particles are different from the first core-shell particles and comprise (a) a polymeric shell comprising carboxylic acid functional groups, and (b) a polymeric core at least partially encapsulated by the polymeric shell, wherein the polymeric shell and/or the polymeric core comprise hydroxyl functional groups.

The coating composition may include second core-shell particles dispersed in the aqueous medium. The second core-shell particles comprise a core that is at least partially encapsulated by the shell. At least a portion of the shell may directly contact at least a portion of the core. Further, the second core-shell particles can have various shapes (or morphologies) and sizes. The second core-shell particles can have generally spherical, cubic, platy, polyhedral, or acicular (elongated or fibrous) morphologies. The second core-shell particles can also have an average particle size of 30 to 300 nanometers, or from 40 to 200 nanometers, or from 50 to 150 nanometers. The "average particle size" can be measured as indicated above in the context of the first core-shell particles.

The second core-shell particles can comprise a polymeric core as well as a polymeric shell. The second core-shell particles may be different from the first core-shell particles, in that the core and/or the shell may be prepared from monomers different from those used to prepare the core and/or the shell of the first core-shell particles.

The polymeric core and polymeric shell of the second core-shell particles can also comprise one or more, such as two or more, reactive functional groups. Suitable reactive functional groups that can be formed on the polymeric shell and/or polymeric core of the second core-shell particles include partially neutralized carboxylic acid groups (e.g., formed from acrylic acid or methacrylic acid monomers), hydroxyl groups (e.g., formed from hydroxy ethyl acrylate or hydroxy methyl acrylate, or hydroxy butyl acrylate or hydroxy propyl acrylate), ethylenically unsaturated groups (e.g., formed from acryl amide), and combinations thereof.

The polymeric shell of the second core-shell particles may include carboxylic acid functional groups and/or hydroxyl functional groups. The polymeric core of the second core-shell particles may include hydroxyl functional groups. The polymeric core may be free of carboxylic acid functional groups and/or hydroxy functional groups. The polymeric shell may include carboxylic acid functional groups and hydroxyl groups while the polymeric core is free of hydroxyl groups. The polymeric shell may include carboxylic acid functional groups and hydroxyl groups while the polymeric core includes hydroxyl groups. The polymeric shell may include carboxylic acid functional groups and be free of hydroxyl groups while the polymeric core includes hydroxyl groups. The polymeric core is at least partially encapsulated by the polymeric shell.

The polymeric core and/or the polymeric shell of the second core-shell particles may include an addition polymer derived from ethylenically unsaturated monomers. The ethylenically unsaturated monomers may be any of the ethylenically unsaturated monomers described in connection with the first core-shell particles. The addition polymer of the polymeric core and/or the polymeric shell of the second core-shell particles includes hydroxyl functional groups and/or carboxylic acid functional groups. The addition polymer of the polymeric core of the second core-shell particles may be crosslinked or not crosslinked.

The polymeric shell of the second core-shell particles may be covalently bonded to at least a portion of the polymeric core, or polymeric shell and the polymeric core may not be covalently bonded together. The polymeric shell can be covalently bonded to the polymeric core by reacting at least one functional group on the monomers and/or prepolymers that are used to form the polymeric shell with at least one functional group on the monomers and/or prepolymers that are used to form the polymeric core. The functional groups can include any of the functional groups previously described provided that at least one functional group on the monomers and/or prepolymers that are used to form the polymeric shell is reactive with at least one functional group on the monomers and/or prepolymers that are used to form the polymeric core. For instance, the monomers and/or prepolymers that are used to form the polymeric shell and polymeric core can both comprise at least one ethylenically unsaturated group that are reacted with each other to form a chemical bond.

The second polymer may comprise a polyester polymer comprising carboxylic acid functional groups and hydroxyl functional groups. The polyester polymer may be a non-core-shell polymer.

The second polymer may include a plurality of second polymers having carboxylic acid and hydroxyl functional groups including, for example, both (1) the second core-shell particles comprising the polymeric shell comprising carboxylic acid functional groups, and the polymeric core which is at least partially encapsulated by the polymeric shell, wherein the polymeric shell and/or the polymeric core comprise hydroxyl functional groups and (2) the polyester polymer comprising carboxylic acid functional and hydroxy functional groups, both dispersed in the aqueous medium.

The second core-shell particles can comprise at least 2 weight percent, such as at least 5 weight percent, at least 10 weight percent, at least 15 weight percent, at least 20 weight percent, at least 30 weight percent, or at least 35 weight percent of the coating composition, based on the total resin solids weight of the coating composition. The second core-shell particles can comprise up to 95 weight percent, such as up to 85 weight percent, up to 75 weight percent, up to 65 weight percent, up to 60 weight percent, or up to 55 weight percent of the coating composition, based on the total resin solids weight of the coating composition. The second core-shell particles can also comprise a range of from 2 to 95 weight percent, such as from 10 to 75 weight percent, from 15 to 65 weight percent, or from 30-60 weight percent of the coating composition, based on the total resin solids weight of the coating composition.

It is appreciated that any combination of first and second polymers described herein can be dispersed in an aqueous medium to form a latex. As used herein, a "latex", with respect to the aqueous dispersed polymers, refers to an aqueous colloidal dispersion of polymeric particles.

The weight ratio of the first polymer to the second polymer in the coating composition may range from 0.05:1 to 10:1, such as from 0.1:1 to 10:1, from 0.5:1 to 10:1, from 0.7:1 to 10:1, from 1:1 to 10:1, from 0.05:1 to 5:1, from 0.1:1 to 5:1, from 0.5:1 to 5:1, from 0.7:1 to 5:1, or from 1:1 to 5:1.

The coating composition further comprises a first crosslinker dispersed in the aqueous medium that is reactive with the first core-shell particles. As used herein, the term "crosslinker" refers to a molecule comprising two or more functional groups that are reactive with other functional groups and which is capable of linking two or more monomers or polymer molecules through chemical bonds.

The first crosslinker can be reactive with the keto and aldo functional groups on the polymeric shell of the first core-shell particles. The first crosslinker can also react with keto and aldo functional groups that can be present on the polymeric core of the first core-shell particles. The first crosslinker can include a polyhydrazide (a material containing two or more hydrazide groups) that is reactive with the keto and aldo functional groups of the first core-shell particles. The polyhydrazides can include non-polymeric polyhydrazides, polymeric polyhydrazides, or combinations thereof. Suitable non-polymeric polyhydrazides include for example hydrazide derivatives of aliphatic or aromatic polycarboxylic acids such as maleic dihydrazide, fumaric dihydrazide, itaconic dihydrazide, phthalic dihydrazide, isophthalic dihydrazide, terephthalic dihydrazide, trimellitic trihydrazide, oxalic dihydrazide, adipic acid dihydrazide, sebacic dihydrazide, and combinations thereof.

The polymeric polyhydrazides can include various types of polymers comprising two or more hydrazide functional groups. The polymeric polyhydrazide can comprise a polyurethane having two or more hydrazide groups. The polyhydrazide functional polyurethane can be prepared by first forming a water-dispersible isocyanate functional polyurethane prepolymer. Such water-dispersible isocyanate functional polyurethane prepolymers can be prepared by reacting polyols, isocyanates, compounds containing carboxylic acids such as diols containing carboxylic acids, and, optionally, polyamines. Such compounds include any of those previously described with respect to the polyurethane prepolymer of the first core-shell particles.

It is appreciated that the isocyanate functional polyurethane prepolymer used to prepare the polyhydrazide functional polyurethane can include additional functional groups. For instance, the isocyanate functional polyurethane prepolymer can also include any of the reactive functional groups previously described such as carboxylic acid groups that can be at least partially neutralized by an organic or inorganic base to form a salt group and enhance the water-dispersibility/stability of the polyurethane. The polyurethane prepolymer can also be free of any of the additional functional groups and can include only hydrazide functional groups and, optionally, carboxylic acid functional groups or other water-dispersible groups. Further, the isocyanate functional polyurethane prepolymer can include additional linkages other than urethanes including, but not limited to, ether linkages, ester linkages, urea linkages, and any combination thereof.

After forming the water-dispersible isocyanate functional polyurethane prepolymer, the polyurethane prepolymer is reacted with hydrazine and/or polyhydrazide compounds to form a water-dispersible polyhydrazide functional polyurethane. The hydrazine and polyhydrazide compounds can also chain extend the isocyanate functional polyurethane prepolymer. Suitable polyhydrazide compounds that can be reacted with the isocyanate functional polyurethane prepolymer include any of the non-polymeric hydrazide functional compounds previously described.

The polymeric polyhydrazides can also comprise core-shell particles comprising a polymeric core at least partially encapsulated by a polymeric shell having two or more hydrazide functional groups. The polyhydrazide functional core-shell particles can be prepared by reacting polyurethane prepolymers having isocyanate and ethylenically unsaturated functional groups with hydrazine and/or polyhydrazide compounds and ethylenically unsaturated monomers and/or polymers. The polyhydrazide functional core-shell particles may be prepared by reacting polyurethane prepolymers having isocyanate and ethylenically unsaturated groups with hydrazine and/or polyhydrazide compounds to form polyurethanes having hydrazide and ethylenically unsaturated groups. The polyurethanes having hydrazide and ethylenically unsaturated groups are then polymerized in the presence of ethylenically unsaturated monomers and/or polymers to form the core-shell particles. The resulting core-shell particles will comprise a polymeric core prepared from ethylenically unsaturated monomers and/or polymers that are covalently bonded to at least a portion of a polyurethane shell having hydrazide functional groups and urethane linkages. The polymeric shell can also comprise additional functional groups (e.g., carboxylic acid functional groups) and/or linkages (e.g., ester linkages and/or ether linkages) as previously described with respect to polyurethane shells. The hydrazide functional core-shell particles can be also free of additional functional groups and linkages such as any of those previously described herein. It is appreciated that the hydrazide functional core-shell particles are free of keto and aldo functional groups.

It was found that polymeric polyhydrazides, such as polyhydrazide functional polyurethanes, can provide improved properties as compared to non-polymeric polyhydrazide compounds when used to crosslink the keto and/or aldo functional core-shell particles of the present invention. Polymeric polyhydrazides have been found to provide improved hardness and water resistance in the final coating as compared to non-polymeric polyhydrazide compounds. It was also found that polyhydrazide functional polyurethanes prepared with hydrazine exhibit improved properties as compared to polyhydrazide functional polyurethanes prepared with polyhydrazide compounds.

The first crosslinker may comprise a non-polymeric hydrazide functional compound, a polymeric hydrazide functional compound, or a combination thereof. When polymeric hydrazides are used, the polymeric hydrazides can include the linear or branched polyhydrazide functional polymers, the polyhydrazide functional core-shell particles, or a combination thereof.

The coating composition also comprises a second crosslinker different from the first crosslinker, and the second crosslinker may be dispersed in the aqueous medium. The second crosslinker is reactive with the first polymer and/or the second polymer. Suitable second crosslinkers include carbodiimides, polyols, phenolic resins, epoxy resins, beta-hydroxy (alkyl) amide resins, hydroxy (alkyl) urea resins, oxazoline, alkylated carbamate resins, (meth)acrylates, isocyanates, blocked isocyanates, polyamines, polyamides, aminoplasts (e.g., a melamine), aziridines, and combinations thereof. The second crosslinker may include a carbodiimide. The second crosslinker may include an aminoplast, such as a melamine. The second crosslinker may include at least one of a carbodiimide and an aminoplast and may include both a carbodiimide and an aminoplast or alternatively a carbodiimide or an aminoplast. The second crosslinker may include an oxazoline. The second crosslinker may include oxazoline in combination with at least one of melamine and carbodiimide. The first crosslinker may be used to crosslink keto and/or aldo groups, and the second crosslinker may be used to crosslink acid groups and/or hydroxyl groups, such as the acid groups and/or the hydroxyl groups on the second polymer.

The coating composition may include the first crosslinker (a polyhydrazide) reactive with the keto and/or aldo functional group, such as any of those previously described, and a carbodiimide and/or an aminoplast and/or an oxazoline reactive with carboxylic acid functional groups and/or hydroxyl groups as the second crosslinker. Suitable carbodiimides are described in U.S. Patent Application Publication No. 2011/0070374 at paragraphs [0023]-[0105], incorporated by reference herein. Suitable aminoplasts include condensates of amines and/or amides with aldehyde. For example, the condensate of melamine with formaldehyde is a suitable aminoplast. A suitable aminoplast is disclosed, for example, in U.S. Pat. No. 6,316,119 at column 5, lines 45-55, incorporated by reference herein.

The first crosslinker may be included in the coating composition in an amount of from 1-10 weight percent, such as from 2-8 weight percent, or 3-7 weight percent based on total solids of the coating composition. The second crosslinker may be included in the coating composition in an amount of from 2-20 weight percent, such as from 4-18 weight percent, 6-14 weight percent, 8-12 weight percent, or 2-10 weight percent based on total solids of the coating composition.

The first and second crosslinker can react with the first and/or second polymer to cure the coating composition. The terms "curable", "cure", and the like mean that at least a portion of the resinous materials in a composition is crosslinked or crosslinkable by chemical reaction. The term "dehydrate" means that at least a portion of the material is dried. Cure or the degree of cure can be determined by dynamic mechanical thermal analysis (DMTA) using a Polymer Laboratories MK III DMTA analyzer conducted under nitrogen. The degree of cure can be at least 10%, such as at least 30%, such as at least 50%, such as at least 70%, or at least 90% of complete crosslinking as determined by the analysis mentioned above.

Further, curing can occur at ambient conditions, with heat, or with other means such as actinic radiation. "Ambient conditions" refers to the conditions of the surrounding environment such as the temperature, humidity, and pressure of the room or outdoor environment. The coating compositions can be cured at ambient room temperature (20° C. to 27° C.). Further, the term "actinic radiation" refers to electromagnetic radiation that can initiate chemical reactions. Actinic radiation includes, but is not limited to, visible light, ultraviolet (UV) light, infrared and near-infrared radiation, X-ray, and gamma radiation.

In addition, the coating composition can comprise additional materials including, but not limited to, additional resins such as additional film-forming resins. As used herein, a "film-forming resin" refers to a resin that can form a self-supporting continuous film on at least a horizontal surface through dehydration and/or upon curing. The term "dehydration" refers to the removal of water and/or other solvents. It is appreciated that dehydration can also cause at least partial curing of a resinous material such as the first and/or second polymers and additional resins described herein. The additional resin can be dehydrated and/or cured at ambient conditions, with heat, or with other means such as actinic radiation as previously described.

The additional resin can include any of a variety of thermoplastic and/or thermosetting film-forming resins known in the art. The term "thermosetting" refers to resins that "set" irreversibly upon curing or crosslinking, wherein the polymer chains of the resins are joined together by covalent bonds. Once cured or crosslinked, a thermosetting resin will not melt upon the application of heat and is insoluble in solvents. As noted, the film-forming resin can also include a thermoplastic film-forming resin. The term "thermoplastic" refers to resins that are not joined by covalent bonds and, thereby, can undergo liquid flow upon heating and can be soluble in certain solvents.

Suitable additional resins include polyurethanes other than those previously described, polyesters such as polyester polyols, polyamides, polyethers, polysiloxanes, fluoropolymers, polysulfides, polythioethers, polyureas, (meth)acrylic resins, epoxy resins, vinyl resins, copolymers thereof, and mixtures thereof. The additional resin included in the coating composition may include a non-core-shell particle hydroxyl functional film-forming resin that is different from the first and second core-shell particles.

The additional resin can have any of a variety of reactive functional groups including, but not limited to, carboxylic acid groups, amine groups, epoxide groups, hydroxyl groups, thiol groups, carbamate groups, amide groups, urea groups, isocyanate groups (including blocked isocyanate groups), (meth)acrylate groups, and combinations thereof. Thermosetting coating compositions typically comprise a crosslinker that may be selected from any of the crosslinkers known in the art to react with the functionality of the resins used in the coating compositions. The crosslinkers can include any of those previously described (e.g., the first and/or the second crosslinker). Alternatively, a thermosetting film-forming resin can be used having functional groups that are reactive with themselves; in this manner, such thermosetting resins are self-crosslinking.

The coating composition may comprises from 5-20 weight percent of the additional resin based on total solids, such as from 5-15 weight percent or from 5-10 weight percent. The coating composition may comprise up to 20 weight percent of the additional resin based on total solids, such as up to 15 weight percent or up to 10 weight percent.

The coating composition can also include additional materials such as a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Suitable colorants include pigments (organic or inorganic), dyes, and tints, such as those used in the paint industry and/or listed in the Dry Color Manufacturers Association (DCMA), as well as special effect compositions. A colorant may include a finely divided solid powder that is insoluble, but wettable, under the conditions of use. A colorant can be organic or inorganic and can be agglomerated or non-agglomerated. Colorants can be incorporated into the coating by use of a grind vehicle, such as an acrylic grind vehicle, the use of which will be familiar to one skilled in the art.

Suitable pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof. The terms "pigment" and "colored filler" can be used interchangeably.

Suitable dyes include, but are not limited to, those that are solvent and/or aqueous based such as phthalo green or blue, iron oxide, and bismuth vanadate.

Suitable tints include, but are not limited to, pigments dispersed in water-based or water miscible carriers such as AQUA-CHEM 896 commercially available from Evonik Industries (Essen, Germany), CHARISMA COLORANTS and MAXITONER INDUSTRIAL COLORANTS commercially available from Accurate Dispersions (South Holland, IL).

The colorant used with the coating composition can also comprise a special effect composition or pigment. As used herein, a "special effect composition or pigment" refers to a composition or pigment that interacts with visible light to provide an appearance effect other than, or in addition to, a continuous unchanging color. Suitable special effect compositions and pigments include those that produce one or more appearance effects such as reflectance, pearlescence, metallic sheen, texture, phosphorescence, fluorescence, photochromism, photosensitivity, thermochromism, goniochromism, and/or color-change, such as transparent coated mica and/or synthetic mica, coated silica, coated alumina, aluminum flakes, a transparent liquid crystal pigment, a liquid crystal coating, and combinations thereof.

Other suitable materials that can be used with the coating composition include plasticizers, abrasion resistant particles, anti-oxidants, hindered amine light stabilizers, UV light absorbers and stabilizers, surfactants, flow and surface control agents, thixotropic agents, catalysts, reaction inhibitors, and other customary auxiliaries.

The substrate over which the coating composition may be applied includes a wide range of substrates. For example, the coating composition of the present invention can be applied to a vehicle substrate, an industrial substrate, an aerospace substrate, and the like.

The vehicle substrate may include a component of a vehicle. In the present disclosure, the term "vehicle" is used in its broadest sense and includes all types of aircraft, spacecraft, watercraft, and ground vehicles. For example, the vehicle can include, but is not limited to an aerospace substrate (a component of an aerospace vehicle, such as an aircraft such as, for example, airplanes (e.g., private airplanes, and small, medium, or large commercial passenger, freight, and military airplanes), helicopters (e.g., private, commercial, and military helicopters), aerospace vehicles (e.g., rockets and other spacecraft), and the like). The vehicle can also include a ground vehicle such as, for example, animal trailers (e.g., horse trailers), all-terrain vehicles (ATVs), cars, trucks, buses, vans, heavy duty equipment, tractors, golf carts, motorcycles, bicycles, snowmobiles, trains, railroad cars, and the like. The vehicle can also include watercraft such as, for example, ships, boats, hovercrafts, and the like. The vehicle substrate may include a component of the body of the vehicle, such as an automotive hood, door, trunk, roof, and the like; such as an aircraft or spacecraft wing, fuselage, and the like; such as a watercraft hull, and the like.

The coating composition may be applied over an industrial substrate which may include tools, heavy duty equipment, furniture such as office furniture (e.g., office chairs, desks, filing cabinets, and the like), appliances such as refrigerators, ovens and ranges, dishwashers, microwaves, washing machines, dryers, small appliances (e.g., coffee makers, slow cookers, pressure cookers, blenders, etc.), metallic hardware, extruded metal such as extruded aluminum used in window framing, other indoor and outdoor metallic building materials, and the like.

The coating composition may be applied over storage tanks, windmills, nuclear plant components, packaging substrates, wood flooring and furniture, apparel, electronics, including housings and circuit boards, glass and transparencies, sports equipment, including golf balls, stadiums, buildings, bridges, and the like.

The substrate can be metallic or non-metallic. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. Non-metallic substrates include polymeric materials, plastic and/or composite material, polyester, polyolefin, polyamide, cellulosic, polystyrene, polyacrylic, poly(ethylene naphthalate), polypropylene, polyethylene, nylon, ethylene vinyl alcohol (EVOH), polylactic acid, other "green" polymeric substrates, poly(ethyleneterephthalate) (PET), polycarbonate, polycarbonate acrylobutadiene styrene (PC/ABS), wood, veneer, wood composite, particle board, medium density fiberboard, cement, stone, glass, paper, cardboard, textiles, leather, both synthetic and natural, and the like. The substrate may comprise a metal, a plastic and/or composite material, and/or a fibrous material. The fibrous material may comprise a nylon and/or a thermoplastic polyolefin material with continuous strands or chopped carbon fiber. The substrate can be one that has already been treated in some manner, such as to impart visual and/or color effect, a protective pretreatment or other coating layer, and the like.

The coating composition of the present invention may be particularly beneficial when applied to a metallic substrate. The coatings of the present invention may be particularly beneficial when applied to metallic substrates that are used to fabricate automotive vehicles, such as cars, trucks, and tractors.

The coating composition may be applied to a substrate having multiple components, wherein the coating composition is simultaneously applied to the multiple components and simultaneously cured to form a coating over the multiple components without deforming, distorting, or otherwise degrading any of the components. The components may be parts of a larger whole of the substrate. The components may be separately formed and subsequently arranged together to form the substrate. The components may be integrally formed to form the substrate.

Non-limiting examples of components of a substrate in the vehicle context include a vehicle body (e.g., made of metal) and a vehicle bumper (e.g., made or plastic) which are separately formed and subsequently arranged to form the substrate of the vehicle. Further examples include a plastic automotive component, such as a bumper or fascia in which the bumper or fascia comprises regions or subcomponents which comprise more than one type of substrate. Further examples include aerospace or industrial components comprising more than one substrate type. It will be appreciated that other such other multi-component substrates are contemplated within the context of this disclosure.

The multiple components may include at least a first component and a second component, and the first component and the second component may be formed from different materials. As used herein, "different materials" refers to the materials used to form the first and second component having different chemical make-ups.

The different materials may be from the same or different class of materials. As used herein, a "class of materials" refers to materials that may have a different specific chemical make-up but share the same or similar physical or chemical properties. For example, metals, polymers, ceramics, and composites may be defined as different classes of materials. However, other classes of materials may be defined depending on similarities in physical or chemical properties, such as nanomaterials, biomaterials, semiconductors, and the like. Classes of materials may include crystalline, semi-crystalline, and amorphous materials. Classes of materials, such as for polymers, may include thermosets, thermoplastics, elastomers, and the like. Classes of materials, such as for metals, may include alloys and non-alloys. As will be appreciated from the above exemplary list of classes, other relevant classes of materials may be defined based on a given physical or chemical property of materials.

The first component may be formed from a metal, and the second component may be formed from a plastic or a composite. The first component may be formed from a plastic, and the second component may be formed from a metal or a composite. The first component may be formed from a composite, and the second component may be formed from a plastic or a metal. The first component may be formed from a first metal, and the second component may be formed from a second metal different from the first metal. The first component may be formed from a first plastic, and the second component may be formed from a second plastic different from the first plastic. The first component may be formed from a first composite, and the second component may be formed from a second composite different from the first composite. As will be appreciated from these non-limiting examples, any combination of different materials from the same or different classes may form the first and second components.

Examples of combinations of materials include thermoplastic polyolefins (TPO) and metal, TPO and acrylonitrile butadiene styrene (ABS), TPO and acrylonitrile butadiene styrene/polycarbonate blend (ABS/PC), polypropylene and TPO, TPO and a fiber reinforced composite, and other combinations. Further examples include aerospace substrates or industrial substrates comprising various components made of a plurality of materials, such as various metal-plastic, metal-composite, and/or plastic-composite containing components. The metals may include ferrous metals and/or non-ferrous metals. Non-limiting examples of non-ferrous metals include aluminum, copper, magnesium, zinc, and the like, and alloys including at least one of these metals. Non-limiting examples of ferrous metals include iron, steel, and alloys thereof.

The first component and the second component (the materials thereof) may exhibit different physical or chemical properties when exposed to elevated temperatures. For example, the first component may deform, distort, or otherwise degrade at a temperature lower than the second component. Non-limiting examples of material properties which may indicate whether a first component deforms, distorts, or otherwise degrades at a temperature lower than the second component include: heat deflection temperature, embrittlement temperature, softening point, and other relevant material properties associated with deformation, distortion, or degradation of materials.

For example, the first component may deform, distort, or otherwise degrade at temperatures ranging from above 80° C. to 120° C., whereas the second component may not deform, distort, or otherwise degrade at temperatures within or below this range. The first component may deform, distort, or otherwise degrade at temperatures below 120° C., such as below 110° C., below 100° C., below 90° C., or below 80° C., whereas the second component may not deform, distort, or otherwise degrade at temperatures within these ranges.

When the coating composition is applied to the substrate having multiple components simultaneously, the applied coating composition may be cured at a temperature which does not deform, distort, or otherwise degrade either of the first and second component (the materials thereof). Thus, the curing temperature may be below the temperature at which either of the first component or the second component would deform, distort, or otherwise degrade. The coating composition may be cured at temperatures ranging from 80° C. to 120° C. where neither the first component nor the second component would deform, distort, or otherwise degrade within that range. The coating composition may be cured at temperatures less than or equal to 120° C., less than or equal to 110° C., less than or equal to 100° C., less than or equal to 90° C., or less than or equal to 80° C. where neither the first component nor the second component would deform, distort, or otherwise degrade within these ranges.

Therefore, the coating composition may be curable at relatively low temperatures, within the ranges mentioned above, such that components formed from different materials may be simultaneously coated with the coating composition and cured to form a coating thereover without deforming, distorting, or otherwise degrading either component.

The present invention is also directed to a multi-layer coating that comprises at least a first basecoat layer formed from a first basecoat composition and a second basecoat layer formed from a second basecoat composition, wherein at least one of the first and second basecoat compositions comprises a coating composition as described above. A "basecoat" refers to a coating that is deposited onto a primer overlying a substrate and/or directly onto a substrate, optionally including components (such as pigments) that impact the color and/or provide other visual impact. As explained in further detail, the multi-layer coating can include additional coating layers including, but not limited to, a topcoat layer. A "topcoat" refers to an uppermost coating that is deposited over another coating layer such as a basecoat to provide a protective and/or decorative layer.

The first basecoat composition and/or the second basecoat composition may include the coating composition of the present invention as describe above (including the aqueous medium, the first polymer, the second polymer, the first crosslinker, and the second crosslinker, and any optional components, if present). The first basecoat composition may be the same or different from the second basecoat composition.

The first basecoat composition can be deposited directly over at least a portion of a substrate or directly over at least a portion of an optional primer coating layer, which is explained in further detail herein, and, optionally, dehydrated and/or cured to form the first basecoat layer.

The first basecoat composition and other compositions of the remaining coating layers of the multi-layer coating of the present invention are particularly beneficial when applied to a metallic substrate. The coatings of the present invention are particularly beneficial when applied to metallic substrates that are used to fabricate automotive vehicles, such as cars, trucks, and tractors.

The first basecoat composition can be applied directly over at least a portion of the substrate or a primer coating layer by any means standard in the art, such as spraying, electrostatic spraying, dipping, rolling, brushing, and the like. Once applied, the composition can be dehydrated and/or cured to form the first basecoat layer. The coating composition can be dehydrated and/or cured at ambient temperatures (20° C. to 27° C.) to 140° C., or from ambient temperatures to 120° C., or from ambient temperatures to 100° C., or from ambient temperatures to 90° C., or from 40° C. to 80° C., or from 50° C. to 80° C.

After the first basecoat composition is applied over the substrate, the second basecoat composition can be formed over at least a portion of the first basecoat composition. The second basecoat composition cured to form the second basecoat layer can provide additional coating thickness and coating properties without undesirable flow obtained when using a single layer to achieve the same result. As previously discussed, the second basecoat layer can be formed from the coating composition of the present invention. The aqueous dispersed polymers can comprise any of the polymers previously described, such as the first polymer and the second polymer. For instance, the second basecoat composition can comprise the same aqueous dispersed first and/or second polymers of the first basecoat composition. Alternatively, the second basecoat composition can comprise any of the aqueous dispersed first and/or second polymers previously described but which are different than the aqueous dispersed first and/or second polymers of the first basecoat composition.

As previously described, the first basecoat composition and/or the second basecoat composition may include the first polymer including the first core-shell particles, which include keto and/or aldo functional groups. The keto and/or aldo functional groups may be formed on the polymeric shell and/or the polymeric core of the first core-shell particles. The keto and/or aldo functional groups of the first core-shell particles of the second basecoat composition may be formed on (1) the polymeric core when the keto and/or aldo functional groups of the first core-shell particles of the first basecoat composition are formed on the polymeric shell; or (2) the polymeric shell when the keto and/or aldo functional groups of the first core-shell particles of the first basecoat composition are formed on the polymeric core.

As previously described, the first basecoat composition and/or the second basecoat composition may include the first crosslinker comprising a polyhydrazide reactive with the first core-shell particles. The polyhydrazide of the first basecoat composition and/or the second basecoat composition may include a non-polymeric polyhydrazide, a polymeric polyhydrazide, or a combination thereof. The polymeric polyhydrazide may include a polyurethane comprising at least two hydrazide functional groups. The polymeric polyhydrazide may be a core-shell particle including (1) a polymeric core at least partially encapsulated by (2) a polymeric shell comprising hydrazide functional groups, with the polymeric core covalently bonded to at least a portion of the polymeric shell. The polymeric polyhydrazide core-shell particle may be obtained from reactants including: ethylenically unsaturated monomers, a polyurethane prepolymer comprising an isocyanate functional group and an ethylenically unsaturated group, and hydrazine and/or non-polymeric polyhydrazides. The first basecoat composition may include a polymeric polyhydrazide and a non-polymeric polyhydrazide. The second crosslinker of the first basecoat composition and/or the second basecoat composition may each independently include a carbodiimide and/or an aminoplast and/or an oxazoline.

The second basecoat composition can also comprise core-shell particles that are different from the previously described first and second polymers. The core-shell particles of the second basecoat composition can include a polymeric core comprising: (i) a (meth)acrylate polymer, a vinyl polymer, or a combination thereof; and (ii) keto and/or aldo functional groups. Moreover, the backbone or main chain of the polymer that forms at least a portion of the polymeric shell can comprise urethane and/or urea linkages and, optionally, other linkages such as ester linkages, ether linkages, and combinations thereof. Thus, the polymeric core can comprise keto and/or aldo functional groups, and the polymeric shell can comprise a polyurethane that is free of keto and/or aldo functional groups and, optionally, free of urea linkages. It is appreciated that such core-shell particles can be prepared with similar materials as described above with respect to the first basecoat layer.

The second basecoat composition may include core-shell particles that are different from those previously described with respect to the first basecoat composition and may be prepared with: (i) ethylenically unsaturated monomers comprising keto and/or aldo functional groups; and (ii) polyurethane prepolymers comprising isocyanate functional groups, carboxylic acid functional groups, and ethylenically unsaturated groups. The resulting core-shell particles may include a keto and/or aldo functional polymeric core that is covalently bonded to at least a portion of a polyurethane shell having pendant carboxylic acid functional groups and urethane and/or urea linkages. Further, the polyurethane shell may be free of keto and/or aldo functional groups as well as urea linkages.

The second basecoat composition can also comprise any of the previously described additional resins (e.g., the non-core-shell particle hydroxyl functional film-forming resin), crosslinkers, colorants, and/or other optional materials. The second basecoat composition can further comprise a polyhydrazide reactive with keto and/or aldo functional groups, a carbodiimide and/or aminoplast, such as a melamine, reactive with carboxylic acid functional groups, and colorants. When the second basecoat composition includes polyhydrazides, the polyhydrazides can be chosen from non-polymeric hydrazides, polymeric hydrazides, and combination thereof. Further, when the first basecoat composition comprises a hydrazide functional compound, the second basecoat composition can comprise the same or different hydrazide functional compound(s). For instance, the first basecoat composition can include a polymeric hydrazide functional compound while the second basecoat composition can include a non-polymeric hydrazide functional compound.

As indicated, the second basecoat composition can comprise colorants. The second basecoat composition can comprise special effect pigments, and the first basecoat composition can be free of special effect pigments. As such, the first basecoat composition can only comprise pigments that impart a continuous unchanging color and the second basecoat composition can only comprise special effect pigments.

The second basecoat composition can be applied directly over at least a portion of the first basecoat composition as a wet-on-wet process, i.e. prior to dehydration of the first basecoat composition. The second basecoat composition can be applied by any means standard in the art, such as spraying, electrostatic spraying, dipping, rolling, brushing, and the like. After the second basecoat composition is applied, both basecoat compositions can be dehydrated and/or cured simultaneously. Both basecoat compositions can be dehydrated and/or cured simultaneously at ambient temperatures (20° C. to 27° C.) to 140° C., or from ambient temperatures to 120° C., or from ambient temperatures to 100° C., or from ambient temperatures to 90° C., or from 40° C. to 80° C., or from 50° C. to 80° C.

The second basecoat composition can also be applied directly over at least a portion of the dehydrated and/or cured first basecoat layer. The second basecoat composition can then be dehydrated and/or cured at ambient temperatures (20° C. to 27° C.) to 140° C., or from ambient temperatures to 120° C., or from ambient temperatures to 100° C., or from ambient temperatures to 90° C., or from 40° C. to 80° C., or from 50° C. to 80° C.

After the basecoat layers have been dehydrated and/or cured, a topcoat layer can be applied over at least a portion of the second basecoat layer. The topcoat layer can be formed from a coating composition that comprises a film-forming resin, a crosslinker, an aqueous or non-aqueous solvent medium, and/or any of the other materials such as those previously described. In comparison to an aqueous medium, a "non-aqueous medium" comprises less than 50 weight percent water, or less than 40 weight percent water, or less than 30 weight percent water, or less than 20 weight percent water, or less than 10 weight percent water, or less than 5 weight percent water, based on the total weight of the liquid medium. The solvents that make up 50 weight percent or more of the liquid medium can include, but are not limited to, any of the organic solvents previously described. Conditions used to cure the topcoat layer are dependent on the components in the topcoat composition. For instance, the topcoat composition can comprise components that will cure at a temperature of 80° C. to 150° C.

The topcoat layer used with the multi-layer coating of the present invention can be a clear topcoat layer. As used herein, a "clearcoat layer" refers to a coating layer that is at least substantially transparent or fully transparent. The term "substantially transparent" refers to a coating, wherein a surface beyond the coating is at least partially visible to the naked eye when viewed through the coating. The term "fully transparent" refers to a coating, wherein a surface beyond the coating is completely visible to the naked eye when viewed through the coating. It is appreciated that the clear topcoat layer can comprise colorants, such as pigments, provided that the colorants do not interfere with the desired transparency of the clear topcoat layer. Alternatively, the clear topcoat layer can be free of colorants such as pigments (i.e., unpigmented).

The first basecoat composition and/or the second basecoat composition may be applied over the substrate in the same processing station and coalesced to form the first and/or second basecoat coating. The clearcoat composition (to form the clearcoat layer) may be applied over the first and/or second basecoat coating in the same processing station as the processing station in which the first and/or second basecoat compositions were applied over the substrate or in separate processing stations separated by a zone in which limited (e.g. ambient temperature drying or dehydration and/or elevated temperature drying or dehydration of less than 10 minutes or 5 minutes) or no drying or dehydration is performed. The first and/or second basecoat compositions and the clearcoat composition may be applied in the same processing station due to the chemistry of the first and/or second basecoat compositions which may coalesce quickly (less than 10 minutes, such as less than 5 minutes) at ambient temperatures (20° C.-27° C.), without requiring higher temperatures to coalesce the first and/or second basecoat compositions.

Topcoat layers that can be used with the multi-layer coating of the present invention include those described in U.S. Pat. No. 4,650,718 at col. 1 line 62 to col. 10 line 16; U.S. Pat. No. 5,814,410 at col. 2 line 23 to col. 9 line 54; and U.S. Pat. No. 5,891,981 at col. 2 line 22 to col. 12 line 37, all of which are incorporated by reference herein. Suitable topcoat coating compositions that can be used to form the topcoat layer also include those commercially available from PPG Industries, Inc. (Pittsburgh, PA) under the trademarks NCT, DIAMOND COAT, and CERAMICLEAR.

The multi-layer coating can also comprise other layers including, but not limited to, additional basecoat layers as well as a primer coating layer as indicated above. As used herein, a "primer coating layer" refers to an undercoating that may be deposited onto a substrate in order to prepare the surface for application of a protective or decorative coating system. The primer coating layer can be formed over at least a portion of the substrate and the first basecoat layer can be formed over at least a portion of the primer coating layer. Further, the additional basecoat layers can be prepared from any of the core-shell particles and other materials previously described. The additional basecoat layers can be applied over the second basecoat layer before applying the topcoat layer.

The primer coating layer used with the multi-layer coating of the present invention can be formed from a primer coating composition that comprises a film-forming resin such as a cationic based resin, an anionic based resin, and/or any of the additional film-forming resins previously described. The primer can also include the previously described cross-linkers, colorants, and other optional materials.

Additionally, the primer coating composition can include a corrosion inhibitor. As used herein, a "corrosion inhibitor" refers to a component such as a material, substance, compound, or complex that reduces the rate or severity of corrosion of a surface on a metal or metal alloy substrate. The corrosion inhibitor can include, but is not limited to, an alkali metal component, an alkaline earth metal component, a transition metal component, or combinations thereof. The term "alkali metal" refers to an element in Group 1 (International Union of Pure and Applied Chemistry (IUPAC)) of the periodic table of the chemical elements, and includes, e.g., cesium (Cs), francium (Fr), lithium (Li), potassium (K), rubidium (Rb), and sodium (Na). The term "alkaline earth metal" refers to an element of Group 2 (IUPAC) of the periodic table of the chemical elements, and includes, e.g., barium (Ba), beryllium (Be), calcium (Ca), magnesium (Mg), and strontium (Sr). The term "transition metal" refers to an element of Groups 3 through 12 (IUPAC) of the periodic table of the chemical elements, and includes, e.g., titanium (Ti), Chromium (Cr), and zinc (Zn), among various others.

Suitable inorganic components that act as a corrosion inhibitor include magnesium oxide, magnesium hydroxide, magnesium carbonate, magnesium phosphate, magnesium silicate, zinc oxide, zinc hydroxide, zinc carbonate, zinc phosphate, zinc silicate, zinc dust, and combinations thereof.

The components of the primer coating composition can be selected to form an electrodepositable coating composition. An "electrodepositable coating composition" refers to a coating composition that is capable of being deposited onto an electrically conductive substrate under the influence of an applied electrical potential. Suitable electrodepositable coating compositions include conventional anionic and cationic electrodepositable coating compositions, such as epoxy or polyurethane-based coatings. Suitable electrodepositable coatings are disclosed in U.S. Pat. No. 4,933,056 at col. 2 line 48 to col. 5 line 53; U.S. Pat. No. 5,530,043 at col. 1 line 54 to col. 4 line 67; U.S. Pat. No. 5,760,107 at col. 2 line 11 to col. 9 line 60; and U.S. Pat. No. 5,820,987 at col. 3 line 48 to col. 10 line 63, all of which are incorporated by reference herein. Suitable electrodepositable coating compositions also include those commercially available from PPG Industries, Inc. (Pittsburgh, PA) such as ED-6280, ED-6465, and ED-7000.

The first basecoat composition may be applied over the electrodepositable coating composition without an intermediate primer composition being applied therebetween. The second basecoat composition may be applied over the first basecoat composition. The first basecoat composition and/or the second basecoat composition may prevent at least a portion of ultraviolet radiation incident upon the first basecoat coating and/or the second basecoat coating (formed by coalescing of the first and/or second basecoat composition) from passing therethrough to the electrodepositable coating composition.

As indicated, the primer coating composition can be deposited directly over at least a portion of a substrate before application of the first basecoat composition and dehydrated and/or cured to form the primer coating layer. The primer coating composition of the present invention can be applied by any means standard in the art, such as electrocoating, spraying, electrostatic spraying, dipping, rolling, brushing, and the like. Once the primer coating composition is applied to at least a portion of the substrate, the composition can be dehydrated and/or cured to form the primer coating layer. The primer coating composition can be dehydrated and/or cured at a temperature of 175° C. to 205° C. to form the primer coating layer.

The present invention is also directed to a method of applying a multi-layer coating to a substrate. The method can comprise: forming a first basecoat layer over at least a portion of a substrate by depositing a first basecoat composition directly onto at least a portion of the substrate; forming a second basecoat layer over at least a portion of the first basecoat layer by depositing a second basecoat composition directly onto at least a portion of: (1) the first basecoat layer after the first basecoat composition is dehydrated and/or cured; or (2) the first basecoat composition before the first basecoat composition is dehydrated and/or cured. The first and second basecoat compositions can be dehydrated and/or cured separately or simultaneously at ambient temperatures (20° C. to 27° C.) to 140° C., or from ambient temperatures to 120° C., or from ambient temperatures to 100° C., or from ambient temperatures to 90° C., or from 40° C. to 80° C., or from 50° C. to 80° C. Optionally, the method also comprises forming a topcoat layer over at least a portion of the second basecoat layer by depositing a topcoat composition directly onto at least a portion of the second basecoat layer.

The substrate may include a primer coating layer and the first basecoat layer is applied over at least a portion of the primer coating layer by depositing a first basecoat composition directly onto at least a portion of the primer coating layer. The primer coating layer can be formed by depositing a primer coating composition, such as by electrodepositing an electrodepositable coating composition, onto at least a portion of the substrate prior to depositing the first basecoat composition.

The multi-layer coatings can also be applied to automotive parts in an automotive assembly plant. During application of the multi-layer coating in an automotive assembly plant, a metal substrate is optionally first passed to an electrodeposition station where the primer coating composition is electrodeposited over the metal substrate and dehydrated and/or cured. The first basecoat composition is then directly applied over the electrodeposited coating layer or, alternatively, directly applied over at least a portion of the substrate in a basecoat zone comprising one or more coating stations. The basecoat zone can be located downstream of and adjacent to an electrodeposition oven. The first basecoat station has one or more conventional applicators, e.g., bell or gun applicators, connected to or in flow communication with a source of the first basecoat composition. The first basecoat composition can be applied, e.g., sprayed, over the substrate by one or more applicators at the first basecoat station in one or more spray passes to form a first basecoat layer over the substrate.

A drying device, such as an oven or flash chamber, can be located downstream of and/or adjacent to the first basecoat station to optionally dehydrate and/or cure the first basecoat layer. Thus, the first basecoat composition can be dehydrated and/or cured before continuing on to the next coating phase. Alternatively, the first basecoat composition is not dehydrated and/or cured before continuing on to the next coating phase.

A second basecoat station can be located downstream of and/or adjacent to the first basecoat station and can have one or more conventional applicators, e.g., bell or gun applicators, connected to and in flow communication with a source of the second basecoat composition. The second basecoat composition can be applied, e.g., sprayed, over the first basecoat composition by one or more applicators in one or more spray passes as a wet-on-wet process if the first basecoat composition was not previously dehydrated and/or cured. Alternatively, the second basecoat composition can be applied, e.g., sprayed, over the first basecoat layer by one or more applicators in one or more spray passes after the first basecoat composition was dehydrated and/or cured. Alternatively, the second basecoat composition can be applied over the first basecoat composition in the same basecoat station as the first basecoat composition (first basecoat station).

The first basecoat composition and/or the second basecoat composition may be spray applied over the substrate. The spray applicator applying the first basecoat composition and/or the second basecoat composition may selectively apply the first basecoat composition and/or the second basecoat composition to a defined area on the substrate, without spraying the first basecoat composition and/or the second basecoat composition over an undesired area of the substrate. The selective application of the first basecoat composition and/or the second basecoat composition by the spray applicator may be accomplished without first taping or otherwise masking an undesired area of the substrate to prevent the undesired area from being contacted with the first basecoat composition and/or the second basecoat composition. Therefore, the spray applicator may precisely apply the first basecoat composition and/or the second basecoat composition over the predetermined area of the substrate without overspray into the undesired area.

The second basecoat can be dehydrated and/or cured with a conventional drying device, such as an oven, located downstream of and/or adjacent to the second coating station and/or the first coating station. The second basecoat layer can be dehydrated and/or cured separately when the first basecoat layer has been previously dehydrated and/or cured. Alternatively, when the second basecoat composition is applied wet-on-wet to the first basecoat composition, both basecoat compositions can be simultaneously dehydrated and/or cured.

After the first basecoat composition and second basecoat composition have been dehydrated and/or cured, one or more conventional topcoat layers can be applied over the basecoat layer(s) at a topcoat station. The topcoat station includes one or more conventional applicators, e.g., bell applicators, connected to and in flow communication with a source of the topcoat composition. An oven is located downstream of and/or adjacent to the topcoat station to dehydrate and/or cure the topcoat composition.

A suitable automotive assembly plant for applying a multi-layer coating is described in U.S. Pat. No. 8,846,156 at col. 3 line 1 to col. 4 line 43 and FIG. 1, which is incorporated by reference herein.

It was found that the multi-layer coatings of the present invention can be formed at lower dehydration/cure temperatures than those typically required in other coatings commonly applied to automotive substrates. The multi-layer coatings also eliminate solvent migration between layers and the need of a primer-surfacer layer. As such, the multi-layer coatings of the present invention help reduce costs, eliminate the amount of coating equipment, and speed up the overall coating process.

The present invention thus relates inter alia, without being limited thereto, to the subject matter of the following clauses:

Clause 1: A coating composition, comprising: an aqueous medium; a first polymer comprising first core-shell particles dispersed in the aqueous medium, wherein the first core-shell particles comprise (i) keto and/or aldo functional groups, (ii) a polymeric shell comprising carboxylic acid functional groups and urethane and/or urea linkages, and (iii) a polymeric core at least partially encapsulated by the polymeric shell, wherein the polymeric shell and/or the polymeric core comprise the keto and/or aldo functional groups; a second polymer dispersed in the aqueous medium, the second polymer comprising carboxylic acid functional groups and hydroxyl functional groups; a first crosslinker comprising a polyhydrazide reactive with the first core-shell particles; and a second crosslinker reactive with the first core-shell particles and/or the second polymer, wherein the polymeric core of the first core-shell particles are covalently bonded to at least a portion of the corresponding polymeric shell.

Clause 2: The coating composition of clause 1, wherein the second polymer comprises a polyester polymer.

Clause 3: The coating composition of clause 1 or 2, wherein the second polymer comprises second core-shell particles, wherein the second core-shell particles are different from the first core-shell particles and comprise (a) a polymeric shell comprising carboxylic acid functional groups and (b) a polymeric core at least partially encapsulated by the polymeric shell, wherein the polymeric shell and/or the polymeric core comprise hydroxyl functional groups.

Clause 4: The coating composition of clause 3, wherein the polymeric core and polymeric shell of the second core-shell particles comprise an addition polymer derived from ethylenically unsaturated monomers, and wherein the addition polymer comprises hydroxyl functional groups and carboxylic acid functional groups.

Clause 5: The coating composition of clause 4, wherein the addition polymer of the polymeric core is crosslinked.

Clause 6: The coating composition of any of clauses 3-5, wherein the polymeric core of the second core-shell particles is free of carboxylic acid functional groups.

Clause 7: The coating composition of any of clauses 1-6, wherein the keto and/or aldo functional groups of the first core-shell particles are formed on the polymeric shell.

Clause 8: The coating composition of clause 7, wherein the first core-shell particles are obtained from reactants comprising: a polyurethane prepolymer comprising an isocyanate functional group, an ethylenically unsaturated group, and carboxylic acid functional groups; ethylenically unsaturated monomers different from the polyurethane prepolymer; and a Michael Addition reaction product of ethylenically unsaturated monomers comprising a keto and/or aldo functional group, and a compound comprising at least two amino groups.

Clause 9: The coating composition of any of clauses 1-8, wherein the keto and/or aldo functional groups of the first core-shell particles are formed on the polymeric core.

Clause 10: The coating composition of clause 9, wherein the first core-shell particles are obtained from reactants comprising: ethylenically unsaturated monomers, wherein at least one of the ethylenically unsaturated monomers comprises keto and/or aldo functional groups; and a polyurethane prepolymer comprising an isocyanate functional group, an ethylenically unsaturated group, and carboxylic acid functional groups.

Clause 11: The coating composition of any of clauses 1-10, wherein the polyhydrazide comprises a non-polymeric polyhydrazide, a polymeric polyhydrazide, or a combination thereof.

Clause 12: The coating composition of clause 11, wherein the polymeric polyhydrazide comprises a polyurethane comprising at least two hydrazide functional groups.

Clause 13: The coating composition of clause 11, wherein the polymeric polyhydrazide comprises core-shell particles comprising (1) a polymeric core at least partially encapsulated by (2) a polymeric shell comprising hydrazide functional groups, wherein the polymeric core is covalently bonded to at least a portion of the polymeric shell.

Clause 14: The coating composition of clause 13, wherein the polymeric polyhydrazide core-shell particles are obtained from reactants comprising: a polyurethane prepolymer comprising an isocyanate functional group and an ethylenically unsaturated group; hydrazine and/or non-polymeric polyhydrazides; and ethylenically unsaturated monomers different from the polyurethane prepolymer and the hydrazine and/or non-polymeric polyhydrazides.

Clause 15: The coating composition of any of clauses 1-14, wherein a weight ratio of the first polymer to the second polymer is from 1:1 to 5:1.

Clause 16: The coating composition of any of clauses 1-15, wherein the second crosslinker comprises a carbodiimide, an aminoplast, and/or an oxazoline.

Clause 17: The coating composition of any of clauses 1-16, further comprising a non-core-shell particle hydroxyl functional film-forming resin.

Clause 18: A substrate at least partially coated with a coating formed from the coating composition of any of clauses 1-17.

Clause 19: A multi-layer coating, comprising: a first basecoat layer applied over at least a portion of a substrate which is formed from a first basecoat composition; and a second basecoat layer applied over at least a portion of the first basecoat composition and which is formed from a second basecoat composition, wherein the first basecoat composition and/or the second basecoat composition comprises: an aqueous medium; a first polymer comprising first core-shell particles dispersed in the aqueous medium, wherein the first core-shell particles comprise (i) keto and/or aldo functional groups, (ii) a polymeric shell comprising carboxylic acid functional groups and urethane and/or urea linkages, and (iii) a polymeric core at least partially encapsulated by the polymeric shell, wherein the polymeric shell and/or the polymeric core comprise the keto and/or aldo functional groups; a second polymer dispersed in the aqueous medium, the second polymer comprising carboxylic acid functional groups and hydroxyl functional groups; a first crosslinker comprising a polyhydrazide reactive with the first core-shell particles; and a second crosslinker reactive with the first core-shell particles and/or the second polymer, wherein the polymeric core of the first core-shell particles are covalently bonded to at least a portion of the corresponding polymeric shell.

Clause 20: The multi-layer coating of clause 19, wherein the second polymer comprises a polyester polymer.

Clause 21: The multi-layer coating of clause 19, wherein the second polymer comprises second core-shell particles, wherein the second core-shell particles are different from the first core-shell particles and comprise (a) a polymeric shell comprising carboxylic acid functional groups, and (b) a polymeric core at least partially encapsulated by the polymeric shell, wherein the polymeric shell and/or the polymeric core comprise hydroxyl functional groups.

Clause 22: The multi-layer coating of any of clauses 19-21, further comprising a primer coating layer directly applied over at least a portion of the substrate, such that the primer coating layer is positioned between the first basecoat layer and the substrate.

Clause 23: The multi-layer coating of clause 21 or 22, wherein the polymeric core and polymeric shell of the second core-shell particles comprise an addition polymer derived from ethylenically unsaturated monomers, and wherein the addition polymer comprises hydroxyl functional groups and carboxylic acid functional groups.

Clause 24: The multi-layer coating of any of clauses 19-23, wherein the keto and/or aldo functional groups of the first core-shell particles of the first basecoat composition are formed on the polymeric shell or the polymeric core; and wherein the keto and/or aldo functional groups of the first core-shell particles of the second basecoat composition are formed on: (1) the polymeric core when the keto and/or aldo functional groups of the first core-shell particles of the first basecoat composition are formed on the polymeric shell; or (2) the polymeric shell when the keto and/or aldo functional groups of the first core-shell particles of the first basecoat composition are formed on the polymeric core.

Clause 25: The multi-layer coating of clause 24, wherein the core-shell particles having the keto and/or aldo functional groups formed on the polymeric shell are obtained from reactants comprising: a polyurethane prepolymer comprising an isocyanate functional group, an ethylenically unsaturated group, and carboxylic acid functional groups; ethylenically unsaturated monomers different from the polyurethane prepolymer; and a Michael Addition reaction product of ethylenically unsaturated monomers comprising a keto and/or aldo functional group, and a compound comprising at least two amino groups.

Clause 26: The multi-layer coating of clause 24, wherein the core-shell particles having the keto and/or aldo functional groups formed on the polymeric core are obtained from reactants comprising: ethylenically unsaturated monomers, wherein at least one of the ethylenically unsaturated monomers comprises keto and/or aldo functional groups; and a polyurethane prepolymer comprising an isocyanate functional group, an ethylenically unsaturated group, and carboxylic acid functional groups.

Clause 27: The multi-layer coating of any of clauses 19-26, wherein the polyhydrazide of the first basecoat composition and the second basecoat composition each independently comprise a non-polymeric polyhydrazide, a polymeric polyhydrazide, or a combination thereof.

Clause 28: The multi-layer coating of clause 27, wherein the polymeric polyhydrazide comprises a polyurethane comprising at least two hydrazide functional groups.

Clause 29: The multi-layer coating of clause 27, wherein the polymeric polyhydrazide comprises core-shell particles comprising (1) a polymeric core at least partially encapsulated by (2) a polymeric shell comprising hydrazide functional groups, wherein the polymeric core is covalently bonded to at least a portion of the polymeric shell.

Clause 30: The multi-layer coating of clause 29, wherein the polymeric polyhydrazide core-shell particles are obtained from reactants comprising: a polyurethane prepolymer comprising an isocyanate functional group and an ethylenically unsaturated group; hydrazine and/or non-polymeric polyhydrazides; and ethylenically unsaturated monomers different from the polyurethane prepolymer and the hydrazine and/or non-polymeric polyhydrazides.

Clause 31: The multi-layer coating of any of clauses 27-30, wherein the first basecoat composition comprises a polymeric polyhydrazide and a non-polymeric polyhydrazide.

Clause 32: The multi-layer coating of any of clauses 19-31, wherein the second crosslinker of the first basecoat composition and the second basecoat composition each independently comprise a carbodiimide, an aminoplast, and/or an oxazoline.

Clause 33: The multi-layer coating of any of clauses 19-32, wherein the second basecoat composition further comprises a non-core-shell particle hydroxyl functional film-forming resin.

Clause 34: The multi-layer coating of any of clauses 19-33, further comprising a topcoat layer applied over at least a portion of the first or second basecoat layer.

EXAMPLES

The following examples are presented to demonstrate the general principles of the invention. The invention should not be considered as limited to the specific examples presented. All parts and percentages in the examples are by weight unless otherwise indicated.

Examples A and B

Preparation of 2K Isocyanate Clearcoats for Application Over Basecoat Layers

Two 2K isocyanate clearcoat compositions were prepared using the components from Table A for application over the coating compositions prepared according to the present invention as described hereinafter in certain of the Examples. Amounts given in Table A are in grams.

TABLE A

| Description | Example A | Example B |
|---|---|---|
| Component A | | |
| n-amyl acetate[a] | 742.56 | 738.69 |
| n-butyl acetate[b] | 1013.76 | 1011.35 |
| ethyl 3-ethoxypropanoate[c] | 384.00 | 382.00 |
| TINUVIN 928[d] | 57.12 | 56.82 |
| TINUVIN 123[e] | 37.92 | 37.72 |
| Siloxane polyol[f] | 127.00 | 126.34 |
| Silica dispersion[g] | 845.06 | 420.20 |
| Silica dispersion[h] | 158.89 | 158.06 |

TABLE A-continued

| Description | Example A | Example B |
|---|---|---|
| Acrylic polyol[i] | 2692.54 | 3095.10 |
| Polyester polyol[j] | 178.13 | 177.21 |
| PRISORINE 3501[k] | 192.00 | 191.00 |
| 10% BYK-378[l] in n-butyl acetate[b] | 24.00 | 23.88 |
| Sub Total | 6452.98 | 6418.36 |
| Component B | | |
| n-amyl acetate[a] | 384.00 | 382.00 |
| n-butyl acetate[b] | 177.60 | 167.13 |
| Aromatic 100[m] | 192.00 | 191.00 |
| 10% Dibutyl tin dilaurate[n] in xylene[o] | 24.00 | 23.88 |
| DESMODUR N-3300A[p] | 1845.60 | 1843.15 |
| DESMODUR Z-4470 BA[q] | 603.43 | 602.33 |
| Subtotal | 3226.63 | 3209.48 |
| Total | 9679.60 | 9627.84 |

[a]A solvent available from Dow Chemical Company (Midland, MI)
[b]A solvent available from Dow Chemical Company (Midland, MI)
[c]A solvent available from Dow Chemical Company (Midland, MI)
[d]A benzotriazole UV absorber available from BASF Corporation (Charlotte, NC)
[e]A hindered amine light stabilizer available from BASF Corporation (Charlotte, NC)
[f]A siloxane polyol made in a step wise process:
[l]Synthesis of a siloxane polyol resin using SILRES IC 816 (methyl hydrogen polysiloxane resin from Wacker Chemie AG (Munich, Germany)) and trimethylolpropanemonoallyl ether using a hydrosilation reaction to form a siloxane polyol resin at 100% theory solids with a GPC weight average molecular weight of about 4,500.
2) The above siloxane polyol resin (180 g) was mixed with 450.6 g of propylene glycol monomethyl ether and 25.8 g of boric acid, heated to reflux for 1 hour, and then distilled until about 300 g of distillate was collected. The result is a siloxane borate adhesion promoter resin with a measured weight solids of about 48% (110° C. for 1 hour), GPC weight average molecular weight of about 4,500, and percent water by weight of less than 0.5%.
[g]A colloidal silica dispersion as described in Example 2, footnote 4, in US 9120916 B1
[h]A fumed silica dispersion consisting of 8% AEROSIL R812, a hydrophobic amorphous silica available from Evonik Industries (Essen, Germany), milled in a polymer consisting of 40% hydroxylpropyl acrylate, 20% styrene, 19% butyl acrylate, 18% butyl methacrylate, 2% acrylic acid, 0.5% methyl methacrylate in a solvent blend of 40% Aromatic 100 type and 60% methyl ether propylene glycol acetate available from Dow Chemical Company (Midland, MI) at 67% solids and about 8500 Mw. Additional methyl ether propylene glycol acetate is added for a total of 53%.
[i]Acrylic polyol as described in footnote 4 in US 2007/0244258 A
[j]Polyester polyol as described in Example A in US 2009/0062453 A
[k]Isostearic acid available from Croda Canada Ltd (Vaughan, Canada)
[l]An additive available from BYK USA Inc. (Wallingford, CT)
[m]A solvent available from Shell Chemical Company (Houston, TX)
[n]Dibutyl tin dilaurate available from Air Products and Chemicals (Allentown, PA)
[o]Xylene solvent available from Ashland Inc. (Wilmington, DE)
[p]A free polyisocyanate available from Covestro (Leverkusen, Germany)
[q]A free polyisocyanate available from Covestro (Leverkusen, Germany)

Example 1

Preparation of a Latex Having Keto Functional Core-Shell Particles

Part A: A polyurethane was first prepared by charging the following components into a four necked round bottom flask fitted with a thermocouple, mechanical stirrer, and condenser: 538 grams of butyl acrylate, 433 grams of FOMREZ 66-56 (hydroxyl terminated saturated linear polyester polyol, commercially available from Chemtura Corporation (Philadelphia, PA)), 433 grams of POLYMEG 2000 polyol (polytetramethylene ether glycol, commercially available from LyondellBasell Industries N.V. (Rotterdam, Netherlands)), 3.1 grams of 2,6-di-tert-butyl 4-methyl phenol, 41.4 grams of hydroxyethyl methacrylate (HEMA), 140 grams of dimethylol propionic acid (DMPA), and 6.3 grams of triethylamine. The mixture was heated to 50° C. and held for 15 minutes. Next, 601.0 grams of isophorone diisocyanate was charged into the flask over 10 minutes, and mixed for 15 minutes. After mixing, 39 grams of butyl acrylate and 1.6 grams of dibutyl tin dilaurate (DBTDL) was charged into the flask and immediate exotherm was observed. After exotherm subsided, the mixture was heated to 90° C. and held for 60 minutes. The mixture was cooled to 70° C. and 538 grams of butyl acrylate and 94.0 grams of hexanediol diacrylate were charged into the flask. The resulting mixture was kept at 60° C. before being dispersed into a water/adduct of diacetone acrylamide/dimethyl ethanolamine/ethylenediamine/surfactant mixture as described below Part B.

Part B: A latex comprising polyurethane-acrylic core-shell particles with urea linkages, urethane linkages, pendant carboxylic acid functionality, and pendant keto functionality on the polyurethane shell was prepared by charging the following components into a four necked round bottom flask fitted with a thermocouple, mechanical stirrer, and condenser: 2400.0 grams of deionized water, 215 grams of diacetone acrylamide, 88 grams of dimethyl ethanolamine, and 50 grams of ethylenediamine. The mixture was heated to 70° C. and held for two hours with an $N_2$ blanket. After heating the mixture, 1925 grams of deionized water and 40 grams of AEROSOL OT-75 (surfactant, commercially available from Cytec Industries (Woodland Park, NJ)) were charged into the flask and held at 50° C. for 15 minutes. Next, 2600.0 grams of the polyurethane prepared in Part A was dispersed into the flask over 20 minutes and mixed for an additional 15 minutes. A mixture of 7.7 grams of ammonium persulfate and 165 grams of deionized water was then charged into the flask over 15 minutes. The temperature rose from 50° C. to 80° C. due to polymerization exotherm. The mixture was held at 75° C. for an additional hour. After being cooled to 40° C., 1.2 grams of FOAMKILL 649 (non-silicone defoamer, commercially available from Crucible Chemical Company (Greenville, SC)), 25 grams of ACTICIDE MBS (microbiocide formed of a mixture of 1,2-benzisothiazolin-3-one and 2-methyl-4-isothiazolin-3-one, commercially available from Thor GmbH (Speyer, Germany)), and 55 grams of deionized water were charged and mixed for an additional 15 minutes. The resulting latex had a solid content of 38.6% (measured at 110° C. for 1 hour) and an average particle size of 60 nm. The average particle size was determined with a Zetasizer 3000HS following the instructions in the Zetasizer 3000HS manual.

Example 2

Preparation of a Latex Having Keto Functional Core-Shell Particles

Part A: A mixture containing a polyurethane acrylate prepolymer was prepared by adding 270 grams of butyl acrylate (BA), 213.8 grams of hydroxyethyl methacrylate, 242.6 grams of dimethylol propionic acid, 4.1 grams of 2,6-di-tert-butyl 4-methyl phenol, 2.1 grams of triphenyl phosphite, 10.8 grams of triethyl amine and 2.1 grams of dibutyl tin dilaurate to a four-necked round bottom flask fitted with a thermocouple, mechanical stirrer, and condenser and heated to 90° C. to obtain a homogeneous solution. Then 1093.5 grams of polytetrahydrofuran (weight average molecular weight (Mw) of approximately 1000) was added. To this mixture at 90° C., 636.1 grams of isophorone diisocyanate was added over 90 minutes. The isocyanate container was rinsed with 54.0 grams of BA. The reaction mixture was stirred at 90° C. until all the isocyanate groups were reacted. Ethylhexyl acrylate (EHA) (1215 grams) was added and cooled.

Part B: A polyurethane acrylic latex containing 9 percent by weight diacetone acrylamide (DAAM) and 6 percent by weight of 1,6-hexanediol diacrylate, the percentages by weight being based on total weight of ethylenically unsaturated monomers, was prepared as follows: Sixty-seven (67) grams of Aerosol OT-75 (surfactant from Cytec Industries (Woodland Park, NJ)), 25.3 grams of ADEKA REASOAP SR-10 (emulsifier from Adeka Corp. (Tokyo, Japan)), 73.8 grams of dimethyl ethanol amine, 1715.7 grams of prepared polyurethane/EHA mixture of Part A, 84.3 grams of 1,6-hexanediol diacrylate, 606.7 grams of methyl methacrylate, 205.6 grams of butyl methacrylate, 252.7 grams of diacetone acrylamide and 4512.0 grams of deionized water were charged to a four-necked round bottom flask fitted with a thermocouple, mechanical stirrer, and condenser and heated to 33° C. to obtain a homogeneous solution. 4.1 grams of t-butylhydroperoxide and 126.4 grams of deionized water was then charged into the flask and mixed for 10 minutes. After that, 4.1 grams of ferrous ammonium sulfate and 2.0 grams of sodium meta bisulfite dissolved in 126.4 grams of deionized water was added over 30 minutes. The reaction mixture was then heated to 65° C. and held at this temperature for 1 hour. After it cooled to 45° C., 29.5 grams of acticide MBS (biocide from Thor GmbH (Speyer, Germany)), 1.52 grams of FOAMKILL 649 (defoamer from Crucible Chemical Co. (Greenville, SC)) and 12.6 grams of deionized water were charged into the flask and mixed for 15 minutes. The resulting latex included core-shell particles and had a solid contents of 38% (measured at 110° C. for 1 hour).

Example 3

Preparation of a Latex Having Core-Shell Particles Having a Polymeric Shell Comprising Carboxylic Acid Functional Groups and Hydroxyl Functional Groups and a Polymeric Core Comprising Hydroxyl Functional Groups A latex having core-shell particles was prepared using the components listed in Table 1.

TABLE 1

| Component | Amount (grams) |
|---|---|
| Charge A | |
| Deionized water | 778.0 |
| RHODAPEX AB/20[1] | 2.1 |
| Charge B | |
| Butyl acrylate | 1.32 |
| Methyl methacrylate | 8.92 |
| Methacrylic acid | 0.28 |
| Deionized water | 11.2 |
| Charge C | |
| Deionized water | 4.4 |
| Ammonium persulfate | 0.1 |
| Charge D | |
| Deionized water | 189.4 |
| RHODAPEX AB/20[1] | 4.58 |
| Methyl methacrylate | 222.07 |
| Butyl acrylate | 89.3 |
| Hexanediol diacrylate | 8.23 |
| Hydroxy ethyl methacrylate | 18.14 |
| Charge E | |
| Deionized water | 74.0 |
| Ammonium persulfate | 0.27 |
| Charge F | |
| Deionized water | 28.6 |
| RHODAPEX AB/20[1] | 0.66 |
| Methyl methacrylate | 8.49 |
| Butyl acrylate | 18.57 |
| Methacrylic acid | 11.59 |
| Hydroxy ethyl acrylate | 12.31 |

TABLE 1-continued

| Component | Amount (grams) |
|---|---|
| Charge G | |
| Deionized water | 54.3 |
| Borax decadydrate granular[2] | 0.44 |
| Ammonium persulfate | 0.14 |
| Charge H | |
| Deionized water | 18.1 |
| Dimethyl ethanol amine | 2.9 |
| Charge I | |
| Deionized water | 14.4 |
| ACTICIDE MBS[3] | 4.2 |

[1]Anionic surfactant available from Solvay S.A. (Brussels, Belgium)
[2]Available from American Borate Company (Virginia Beach, VA)
[3]Microbiocide formed of a mixture of 1, 2-benzisothiazolin-3-one and 2-methyl-4-isothiazolin-3-one available from Thor GmbH (Speyer, Germany)

Charge A was added to a four-neck round bottom flask equipped with a thermocouple, mechanical stirrer, and condenser. Charge A was heated to 65° C. The reaction mixture was heated to 85° C. and Charge B was added, followed by addition of Charge C and then a hold for 30 minutes. Charges D and E were added over 180 minutes, followed by a hold of 60 minutes. Charges F and G were then added over 90 minutes, followed by a hold of 120 minutes and then cooling to 70° C. At this temperature, Charge H was added over 20 minutes. The product was then cooled to 40° C. and then diluted with Charge I and mixed for 15 minutes. The final product has a solid contents of 25% (measured at 110° C. for 1 hour), Brookfield viscosity of around 40 centipoise measured according to ASTM D2196 at ambient temperature (20° C.-27° C.) and pH of 6.6 measured according to ASTM D4584. For measuring pH, the test material is poured into a non-conducting container, the pH electrode is lowered into the sample specimen, and the pH measurement taken. The electrode is removed from the sample specimen, rinsed with solvent, if necessary, then rinsed with deionized water, and returned to its storage vessel.

Example 4

Preparation of a Polyester Polymer

A polyester was prepared according to Example A1 of EP 1,454,971 B1 as follows: In a reactor equipped with a stirrer, a water separator, and a control unit for the temperature, and the following components were mixed and heated to 185° C.: 1732 grams of TERATHANE (polytetramethylene ether glycol having a number average molecular weight of 650 g/mol, commercially available from DuPont (Wilmington, DE)), and 307 grams of trimellitic anhydride. Upon reaching a MEQ Acid content of 0.713 mmol/g (acid number=40 mg KOH/g) as measured according to ASTM D1639, the reaction temperature was lowered to 175° C. The reaction was continued until reaching a MEQ Acid content of 0.535 mmol/g (acid number=30 mg KOH/g). For MEQ Acid content, the sample was weighed based off of theoretical acid and was dissolved in 60 mL of an 80%/20% blend of THF/1,2-Propanediol. The sample was then titrated by a verified 0.1N KOH in Methanol and the end point was determined by a potentiometric electrode. The resulting MEQ Acid content was calculated by the following equation:

$$MEQ\ Acid = \frac{(T-S)*N}{W}$$

where: W=specimen weight in grams, S=volume of the solvent blank, or 0 if no solvent blank determined, T=volume of the sample titration, and N=normality of the standardized potassium hydroxide The Gardner-Holdt viscosity of the resin solution at 60% strength in butoxyethanol was V as measured according to ASTM D1545-89. After cooling the polyester melt to 85° C., 552 grams of a 10% aqueous dimethylethanolamine solution was added followed by 2390 grams of deionized water. A finely divided dispersion was formed having a nonvolatile content of 40% and an acid number of 29 mg KOH/g.

Example 5

Preparation of a Polyether Carbamate

A hydroxy functional polyether carbamate was prepared using the components listed in Table 2.

TABLE 2

| Component | Amount (grams) | Equivalents |
|---|---|---|
| JEFFAMINE D 400[4] | 2000 | 10 |
| Ethylenecarbonate | 968 | 11 |

[4]Polypropyleneoxide amine from Huntsman Corporation (The Woodlands, Texas)

Both the ingredients were added to the reaction vessel and heated to 130° C. The reaction mixture was held at this temperature till greater than 90% of the amine was reacted as measured by potentiometric titration of the mixture, in which the mixture was solubilized in acetic acid and titrated with 0.1 N (normal) perchloric acid in glacial acetic acid. The product was slightly yellowish, had a theoretical % weight solids of 100%, and a weight averaged molecular weight (Mw) of 800 as measured by gel permeation chromatography using a polystyrene standard according to ASTM D6579-11 (performed using a Waters 2695 separation module with a Waters 2414 differential refractometer (RI detector); tetrahydrofuran (THF) was used as the eluent at a flow rate of 1 ml/min, and two PLgel Mixed-C (300×7.5 mm) columns were used for separation at the room temperature; weight and number average molecular weight of polymeric samples can be measured by gel permeation chromatography relative to linear polystyrene standards of 800 to 900,000 Da).

Example 6

Preparation of a Red Basecoat (B1) Coating Composition

A red basecoat coating composition was prepared by mixing the components listed in Table 3.

TABLE 3

| Components | Example 6 (Parts by Weight) |
|---|---|
| Latex of Example 1 | 928.46 |
| Adipic Acid Dihydrazide[5] | 10.45 |
| Polyester Polymer of Example 4 | 178.08 |
| BYK 348[6] | 1.63 |
| BYK 032[7] | 12.62 |
| Red Tint[8] | 297.53 |
| Red Tint[9] | 412.69 |

TABLE 3-continued

| Components | Example 6 (Parts by Weight) |
|---|---|
| Red Tint[10] | 161.59 |
| Black Tint[11] | 3.67 |
| Red Tint[12] | 148.46 |
| White Tint[13] | 3.05 |
| BYKETOL WS[14] | 58.50 |
| SURFYNOL 104E[15] | 26.00 |
| Isopropanol[16] | 58.50 |
| TALCRON MP1052[17] | 26.00 |
| 50% DMEA[18] | 7.80 |
| N-butoxypropanol[19] | 130.00 |
| Deionized Water | 120.00 |
| CARBODILITE V-02-L2[20] | 261.42 |
| Total | 2846.45 |

[5]Crosslinker commercially available from Japan Finechem Company (Tokyo, Japan)
[6]Additive commercially available from BYK Chemie (Wesel, Germany)
[7]Additive commercially available from BYK Chemie (Wesel, Germany)
[8]Red tint paste consisting of 32% BAYFERROX red 140M (Lanxess Corporation (Pittsburgh, PA)) dispersed in a resin blend of 5.65% acrylic resin (8.5% hydroxyethyl acrylate, 18.0% butyl methacrylate, 30.0% styrene, 35% butyl acrylate, 8.5% acrylic acid made at 27% solids), 4.6% acrylic-polyester-urethane resin (3.0% ethylene glycol dimethylacrylate, 11.0% methyl methacrylate, 9.0% butyl acrylate, 2.0% acrylic acid, and 75% polyester-acrylic-urethane (neopentyl glycol, adipic acid, and hydroxyethyl acrylate-butyl acrylate, 1,6-hexamethylene diisocyanate) made at 43.5% solid). The dispersion had a 46.3% weight solids content.
[9]Red tint paste consisting of 12% HOSTAPERM pink E (Clariant Specialty Chemicals (Muttenz, Switzerland)) dispersed in a resin blend of 6.8% acrylic resin (8.5% hydroxyethyl acrylate, 18.0% butyl methacrylate, 30.0% styrene, 35% butyl acrylate, 8.5% acrylic acid made at 27% solids), 5.3% acrylic-polyester-urethane resin (3.0% ethylene glycol dimethylacrylate, 11.0% methyl methacrylate, 9.0% butyl acrylate, 2.0% acrylic acid, and 75% polyester-acrylic-urethane (neopentyl glycol, adipic acid, and hydroxyethyl acrylate-butyl acrylate, 1,6-hexamethylene diisocyanate) made at 43.5% solids). The dispersion has a 24.8% weight solids content.
[10]Red tint paste consisting of 12% PALIOGEN red L-3875 (BASF (Ludwigshafen, Germany)) dispersed in a resin blend of 6.6% acrylic resin (8.5% hydroxyethyl acrylate, 18.0% butyl methacrylate, 30.0% styrene, 35% butyl acrylate, 8.5% acrylic acid made at 27% solids), 5.4% acrylic-polyester-urethane resin (3.0% ethylene glycol dimethylacrylate, 11.0% methyl methacrylate, 9.0% butyl acrylate, 2.0% acrylic acid, and 75% polyester-acrylic-urethane (neopentyl glycol, adipic acid, and hydroxyethyl acrylate-butyl acrylate, 1,6-hexamethylene diisocyanate) made at 43.5% solids). The dispersion has a 25.3% weight solids content.
[11]Black tint paste consisting of 6% carbon black dispersed in a resin blend of 8.6% acrylic resin (8.5% hydroxyethyl acrylate, 18.0% butyl methacrylate, 30.0% styrene, 35% butyl acrylate, 8.5% acrylic acid made at 27% solids), 7.2% acrylic-polyester-urethane resin (3.0% ethylene glycol dimethylacrylate, 11.0% methyl methacrylate, 24.0% butyl acrylate, 2.0% acrylic acid, and 60% polyester-acrylic-urethane (neopentyl glycol, adipic acid, and hydroxyethyl acrylate-butyl acrylate, 1,6-hexamethylene diisocyanate) made at 43.5% solids). The dispersion has a 25.4% weight solids content.
[12]Red tint paste consisting of 13% SICOTRANS Red L2817 (BASF (Ludwigshafen, Germany)) dispersed in a resin blend of 12.2% acrylic resin (8.5% hydroxyethyl acrylate, 18.0% butyl methacrylate, 30.0% styrene, 35% butyl acrylate, 8.5% acrylic acid made at 27% solids), 1.7% acrylic-polyester-urethane resin (3.0% ethylene glycol dimethylacrylate, 11.0% methyl methacrylate, 24.0% butyl acrylate, 2.0% acrylic acid, and 60% polyester-acrylic-urethane (neopentyl glycol, adipic acid, and hydroxyethyl acrylate-butyl acrylate, 1,6-hexamethylene diisocyanate) made at 43.5% solids). The dispersion has a 31.5% weight solids content.
[13]White tint paste consisting of 61% TiO2 dispersed in a resin blend of 3.4% acrylic resin (8.5% hydroxyethyl acrylate, 18.0% butyl methacrylate, 30.0% styrene, 35% butyl acrylate, 8.5% acrylic acid made at 27% solids), 3.5% acrylic-polyester-urethane resin (3.0% ethylene glycol dimethylacrylate, 11.0% methyl methacrylate, 24.0% butyl acrylate, 2.0% acrylic acid, and 60% polyester-acrylic-urethane (neopentyl glycol, adipic acid, and hydroxyethyl acrylate-butyl acrylate, 1,6-hexamethylene diisocyanate) made at 43.5% solids). The dispersion has a 70.4% weight solids content.
[14]Additive commercially available from BYK Chemie (Wesel, Germany)
[15]Additive commercially available from Air Products & Chemicals (Allentown, PA)
[16]Solvent commercially available from Dow Chemical Company (Midland, MI)
[17]Magnesium silicate commercially available from Barretts Minerals Inc. (Helena, MT)
[18]Dimethylethanolamine 50% aqueous solution
[19]Solvent commercially available from Dow Chemical Company (Midland, MI)
[20]Crosslinker commercially available from Nisshinbo Chemical Inc. (Tokyo, Japan)

Examples 7-8

Preparation of a Red Basecoat (B2) Coating Composition

The red basecoat B2 coating composition was prepared by mixing each component in Table 4 in the order listed. A pre-blend was made with the deionized water and LAPONITE RD BYK Chemie (Wesel, Germany) and that mixture was added to the preceding ingredients. An additional pre-blend was made of the n-butoxypropanol, odorless mineral spirits, 2-ethylhexanol, mica, aluminum paste, and aluminum passivation agent and that mixture was added to the preceding ingredients.

TABLE 4

| Components | Example 7 (Parts by Weight) | Example 8 (Parts by Weight) |
|---|---|---|
| Latex of Example 2 | 1387.40 | 1646.38 |
| Adipic Acid Dihydrazide[5] | 18.80 | 22.31 |
| Polyester Polymer of Example 4 | 494.66 | 494.66 |
| Polyether Carbamate of Example 5 | 22.23 | 22.23 |
| Latex of Example 3 | 385.44 | — |
| 50% DMEA[18] | 19.30 | 14.70 |
| BYK 348[6] | 2.65 | 2.65 |
| Red Tint[21] | 521.15 | 521.15 |
| Maroon Tint[22] | 177.05 | 177.05 |
| Red Tint[23] | 152.00 | 152.00 |
| Red Tint[24] | 41.67 | 41.67 |
| Black Tint[11] | 13.35 | 13.35 |
| White Tint[13] | 15.03 | 15.03 |
| Deionized Water | 778.55 | 778.55 |
| LAPONITE RD[25] | 15.64 | 15.64 |
| N-butoxypropanol[19] | 335.00 | 335.00 |
| Odorless Mineral Spirits[26] | 73.38 | 73.38 |
| 2-Ethylhexanol[27] | 89.36 | 89.36 |
| Mica Pigment[28] | 40.51 | 40.51 |
| Aluminum Paste[29] | 94.42 | 94.42 |
| Al passivation Agent | 116.29 | 116.29 |
| Deionized Water | 342.30 | 352.00 |
| CARBODILITE V-02-L2[20] | 363.22 | 358.23 |
| Total | 5499.40 | 5376.56 |

[21]Red tint paste consisting of 22% SUNFAST Red 254 (Sun Chemical (Troy Hills, NJ)) dispersed in 23.7% acrylic polymer, which was an acrylic-polyester-urethane resin having the following monomer make-up (3.0% ethylene glycol dimethylacrylate, 11.0% methyl methacrylate, 24.0% butyl acrylate, 2.0% acrylic acid, and 60% polyester-acrylic-urethane (neopentyl glycol, adipic acid, and hydroxyethyl acrylate-butyl acrylate, 1,6-hexamethylene diisocyanate) made at 43.5% solids). The dispersion has a 50.4% weight solids content.
[22]Maroon tint paste consisting of 21% PERRINDO Maroon 179 (Sun Chemical (Troy Hills, NJ)) dispersed in a resin blend of 8.3% acrylic resin (8.5% hydroxyethyl acrylate, 18.0% butyl methacrylate, 30.0% styrene, 35% butyl acrylate, 8.5% acrylic acid made at 27% solids), 1.7% acrylic-polyester-urethane resin (3.0% ethylene glycol dimethylacrylate, 11.0% methyl methacrylate, 24.0% butyl acrylate, 2.0% acrylic acid, and 60% polyester-acrylic-urethane (neopentyl glycol, adipic acid, and hydroxyethyl acrylate-butyl acrylate, 1,6-hexamethylene diisocyanate) made at 43.5% solids). The dispersion has a 31.9% weight solids content.
[23]Red tint paste consisting of 28% IRGAZIN Rubine L4025 (BASF (Ludwigshafen, Germany)) dispersed in 12.6% acrylic polymer, which had the following monomer make-up (10.2% hydroxyethyl acrylate, 42.6% methyl methacrylate, 10.1% styrene, 29.1% butyl acrylate, 8.0% acrylic acid made at 24.8% solids). The dispersion has a 40.9% weight solids content.
[24]Red tint paste consisting of 25% KROMA RED Iron Oxide RO 3097 (Huntsman Corporation (The Woodlands, TX)) dispersed in 16% acrylic polymer, which had the following monomer make-up (8.5% hydroxyethyl acrylate, 18.0% butyl methacrylate, 30.0% styrene, 35% butyl acrylate, 8.5% acrylic acid made at 27% solids). The dispersion has a 47.4% weight solids content.
[25]Sodium lithium magnesium silicate available from BYK Chemie (Wesel, Germany)
[26]Solvent commercially available from Shell Chemical Company (Houston, TX)
[27]Solvent commercially available from Dow Chemical Company (Midland, MI)
[28]IRIODIN 97225 Ultra Rutile Blue Pearl SW available from Merck KGaA (Darnstadt, Germany)
[29]PALIOCROM Orange L2800 available from BASF (BASF (Ludwigshafen, Germany))

Example 9-10

Forming Coated Panels

The red B1 and red B2 coating compositions of Examples 6-8 were spray applied in an environment controlled to 70-75° F. (21-24° C.) and 60-65% relative humidity onto 4 inch by 12 inch steel panels that were coated with PPG Electrocoat (ED-6465) commercially available from PPG Industries, Inc. (Pittsburgh, PA) as follows. The substrate panels were obtained from ACT Test Panels, LLC (Hillsdale, MI). The red B1 coating composition was applied in one coat and then flashed at ambient temperature for 4 minutes. The film thickness was approximately 14 microns. One of the red B2 coating compositions were then applied wet-on-wet over the red B1 composition in two coats, with a 90 second flash between coats, and then flashed at ambient temperature for 4 minutes and then dehydrated for 5 minutes at 80° C. The red B2 film thicknesses were approximately 17 microns.

After forming the B1 and B2 layers, the 2K isocyanate clearcoat composition of Example A was applied over the basecoated panels in two coats with a 90 second flash between coats. The clearcoated panels were allowed to flash for 7 minutes at ambient condition and baked for 30 minutes at 80° C. The film thickness was approximately 50 microns.

Longwave and shortwave appearance, sag resistance, and hardness properties were tested on the coated panels, and the results are shown in Table 5.

TABLE 5

| Example | Layer Description | BYK Wavescan[30] Longwave | | Shortwave | | Sag Resistance[31] | Hardness[32] |
|---|---|---|---|---|---|---|---|
| | | Horizontal | Vertical | Horizontal | Vertical | | |
| Example 9 | Example 6 B1 Example 7 B2 | 2.7 | 11.8 | 12.2 | 12.1 | No sag | 117 |
| Example 10 | Example 6 B1 Example 8 B2 | 3.4 | 15.9 | 15.6 | 16.7 | Sag- bottom edge build on panel | 107 |

[30]Using BYK Wavescan instrument manufactured by BYK Gardner USA (Columbia, MD) where horizontal and vertical are the positions of the coated panels
[31]Visual observation
[32]Hardness values were measured in (N/mm$^2$) units using a HM2000 Fischer Microhardness instrument (available from Fischer Technology, Inc. (Windsor, CT)), and hardness was measured one week after application of the multi-layer coatings Lower values in longwave and shortwave, no sag, and higher hardness are more desirable physical properties. Both coatings in Examples 9 and 10 provided good longwave and shortwave and hardness properties. Inclusion of the second polymer in the form of a core-shell particle also improved sag resistance and provided incremental improvements in hardness and appearance.

Examples 11-14

Preparation of Unpigmented Coating Compositions

Unpigmented coating compositions were prepared by mixing the components shown in Table 6 below. Table 6 shows components in parts by weight.

TABLE 6

| Components | Comp. Example 11 | Example 12 | Comp. Example 13 | Example 14 |
|---|---|---|---|---|
| Latex of Example 1 | — | — | 26.00 | 13.00 |
| Latex of Example 2 | 25.91 | 12.95 | — | — |
| Adipic Acid Dihydrazide[5] | 0.34 | 0.17 | 0.30 | 0.15 |
| Polyester Polymer of Example 4 | — | 10.27 | — | 10.27 |
| RESIMENE HM-2608[33] | — | 1.39 | — | 1.39 |
| Total | 26.24 | 24.78 | 26.30 | 24.81 |

[33]Melamine resin commercially available from Cytec Industries (Woodland Park, NJ)

Drawdowns of these unpigmented coating compositions were made using a square applicator #14 from Gardco Paul N. Gardner Company Incorporated (Pompano Beach, FL) to a dry film thickness of approximately 25-35 microns over electrocoated panels ED6465 available from ACT Test Panels LLC (Hillsdale, MI). The drawdowns were allowed to flash for 10 minutes at ambient conditions then baked in an oven for 30 minutes at either 80° C. or 100° C. The testing of properties for cure were performed the following day. Examples 12 and 14 showed improved MEK double rubs and isopropanol spot testing as a measure of cure response at both 80° C. and 100° C. bake temperatures, as shown in Table 7.

TABLE 7

| Example | Bake Temperature | MEK Double Rubs[34] | Isopropanol Spot[35] | Comment |
|---|---|---|---|---|
| Comp. Example 11 | 80° C. | 86 | Scuff | Fail |
| Comp. Example 11 | 100° C. | 85 | Scuff | Fail |
| Example 12 | 80° C. | 100 | Scuff | Pass |
| Example 12 | 100° C. | 100 | Light scuff | Pass |

TABLE 7-continued

| Example | Bake Temperature | MEK Double Rubs[34] | Isopropanol Spot[35] | Comment |
|---|---|---|---|---|
| Comp. Example 13 | 80° C. | 100 | Some coating removal | Fail |
| Comp. Example 13 | 100° C. | 100 | Scuff | Pass |
| Example 14 | 80° C. | 100 | Scuff | Pass |
| Example 14 | 100° C. | 100 | Light scuff | Pass |

[34]MEK Double Rub test performed according to ASTM D5402; 100 = Pass, <100 = Fail
[35]Isopropanol spot test performed by placing 5 drops of isopropanol solvent on the coated panel. Immediately after solvent evaporated from coating a wooden tongue depressor was used to determine coating integrity by pushing into the surface at approximately 45° angle. A visual rating of the coated surface was then made as follows: Ratings are no scuff > light scuff > scuff > some coating removal > coating removal In the "Comment" column of Table 7, each coating example received a "pass" or "fail" rating. A "pass" rating was associated with a coating that achieved at least 100 MEK double rubs and a "no scuff", "light scuff", or "scuff" isopropanol spot rating. A "fail" rating was associated with a coating that did not achieve at least 100 MEK double rubs or received a "some coating removal" or "coating removal" isopropanol spot rating.

Example 15

Preparation of a Polymeric Hydrazide

Part A: A polyurethane was first prepared from the components shown in Table 8.

TABLE 8

| Component | Amount (grams) |
|---|---|
| Charge A | |
| Butyl Acrylate | 764.5 |
| FOMREZ 66-56 | 1125 |
| 2,6-di-tert-butyl 4-methyl phenol | 2.25 |
| Dibutyl tin dilaurate | 3.4 |
| Dimethylol propionic acid | 202.5 |
| Triethyl amine | 8.1 |
| Isophorone diisocyanate | 749.3 |

Charge A was added to a four-neck round bottom flask equipped with a thermocouple, mechanical stirrer, and condenser. Charge A was heated to 50° C. and held for 15 minutes. The mixture was slowly heated to 90° C., and held for 60 minutes. The isocyanate equivalent weight was measured to be 1132. The mixture was kept at 60° C. before being dispersed into water.

Part B: A latex comprising core-shell particles with hydrazide and carboxylic acid functionality was prepared from the components shown in Table 9.

TABLE 9

| Component | Amount (grams) |
|---|---|
| Charge A | |
| DI water | 4950 |
| Dimethylethanolamine | 134.7 |
| Adipic dihydrazide | 320.2 |
| Dioctyl sulfosuccinate | 75.0 |
| Charge B | |
| Polyurethane of Part A | 2600 |
| Charge C | |
| Ammonium persulfate | 2.5 |
| 1% aqueous solution ferrous ammonium sulfate | 5.0 |
| t-butylhydrogen peroxide (30% aqueous) | 5.0 |
| DI water | 200 |
| Charge D | |
| FOAMKILL 649[51] | 1.2 |
| Sodium metabisulfate | 6.0 |
| ACTICIDE MBS[3] | 21 |
| DI water | 50 |

[51]Non-silicone defoamer, commercially available from Crucible Chemical Company (Greenville, SC)

Charge A was added to a four-neck round bottom flask equipped with a thermocouple, mechanical stirrer, and condenser. Charge A was heated to 50° C. and held for two hours with an $N_2$ blanket. Charge B was then dispersed into the flask over 20 minutes and mixed for an additional 15 minutes. Charge C was added over 15 minutes, followed by addition of charge D over 30 minutes. The temperature rose from 50° C. to 71° C. due to polymerization exotherm. The mixture was held at 75° C. for an additional one hour. After being cooled to ambient temperature. Charge D was added and mixed for an additional 15 minutes. The latex had a solid content of 35.3%.

Example 16

Preparation of a Polyester Polymer

A polyester polymer was prepared by mixing the components shown in Table 10 below.

TABLE 10

| Component | Parts by Weight (grams) |
|---|---|
| EMPOL 1008[36] | 4206.3 |
| Cyclohexyl dimethanol | 1100.5 |
| Dimethand propionic acid | 301.5 |
| Trimellitic anhydride | 150.0 |
| Butyl ether of propylene glycol | 2241.7 |

[36]A dimerdiacid available from Cognis (Monheim am Rhein, Germany)

The polyester polymer was prepared in a four-neck round bottom flask equipped with a thermometer, mechanical stirrer, condenser, dry nitrogen sparge and a heating mantle. The first four ingredients were heated to a temperature of 180° C. and stirred in the flask until 257 grams of distillate was collected and the acid value dropped to the range of 22-25. The material was then cooled to a temperature of 130° C. and the butyl ether of propylene glycol was added. This polyester was then neutralized with dimethylethanolamine, and then diluted with water to a final solids of 20 percent. The weight average molecular weight was approximately 25,000 as measured by gel permeation chromatography using polystyrene standards.

Example 17

Preparation of a Mid-Gray Basecoat (B1) Coating Composition

A mid-gray basecoat (B1) coating composition was prepared by mixing the components shown in Table 11 below. Table 11 shows components in parts by weight.

TABLE 11

| Components | Example 18 |
|---|---|
| Latex of Example 1 | 480.92 |
| Latex of Example 2 | 66.67 |
| Adipic Acid Dihydrazide[5] | 3.25 |
| Polymeric Hydrazide of Example 15 | 117.19 |
| Polyester Polymer of Example 16 | 500.00 |
| CARBODILITE V-02-L2[20] | 188.75 |
| BYK 348[6] | 1.30 |
| BYK 032[7] | 9.62 |
| Extender Tint[37] | 241.27 |
| White Tint[13] | 165.65 |
| Yellow Tint[38] | 40.00 |
| Black Tint[11] | 106.80 |
| BYKETOL WS[14] | 45.00 |
| SURFYNOL 104E[15] | 20.00 |
| Isopropanol[16] | 45.00 |
| TALCRON MP1052[17] | 20.00 |
| 50% DMEA[18] | 26.00 |
| N-butoxypropanol[19] | 50.00 |
| Total | 2127.42 |

[37]Extender tint paste consisting of 61% barium sulfate dispersed in 9.3% acrylic polymer of Example 4 and having a solids content of 71.8%
[38]Yellow tint paste consisting of 25% yellow iron oxide dispersed in 15.5% acrylic polymer, which had the following monomer make-up (8.5% hydroxyethyl acrylate, 18.0% butyl methacrylate, 30.0% styrene, 35% butyl acrylate, 8.5% acrylic acid made at 27% solids). The dispersion has a 45.0% weight solids content.

Example 18

Preparation of a Polyurethane Dispersion

This example was prepared in 2 steps:

Step 1: A polyester intermediate was prepared from the following ingredients as described below.

TABLE 12

| Components | Parts by Weight (grams) |
|---|---|
| Neopentyl glycol | 3327.5 |
| Adipic acid | 3350.9 |
| Maleic anhydride | 321.5 |
| Butylstannoic acid | 0.203 |
| PROGLYDE DMM[39] | 2040.1 |

[39]An aprotic glycol diether solvent available from Dow Chemical Company (Midland, MI)

A total of 3327.5 grams of neopentyl glycol, 3350.9 grams of adipic acid, 321.5 grams of maleic anhydride, and 0.203 grams of butylstannoic acid were added to a suitable reaction vessel equipped with a stirrer, temperature probe, and glycol recovery setup (a packed column with an empty column on top and a distillation head connected to a water cooled condenser), and a nitrogen sparge. The contents of the reactor were gradually heated to 215° C. with continuous removal of water distillate beginning at about 140° C. The temperature of the reaction mixture was held at 215° C. until about 892.4 grams of distillate had been collected and the acid value of the reaction mixture was 1.86 mg KOH/g sample. The contents of the reactor were cooled to 160° C. before thinning to 75% theory solids with 2040.1 grams of PROGLYDE DMM. The final resin solution had a measured percent solids (110° C./1 hour) of about 73.7%, a Gardner-Holt viscosity of K-L, an acid value of 1.08 mg KOH/g sample, and a hydroxyl value of about 72.8 mg KOH/g sample. Gel permeation chromatography was used with tetrahydrofuran solvent and polystyrene standards to determine a weight average molecular weight of 3434.

Step 2: A polyurethane dispersion was prepared as follows:

To a 5 Liter round-bottom flask (equipped with a stirrer, temperature probe, reflux condenser and nitrogen atmosphere) were added 187.1 grams of PROGLYDE DMM and 1316.9 grams of the polyester intermediate. The contents of the flask were heated to 45° C. and 231.7 grams of Isophorone diisocyanate was added from an addition funnel over 30 minutes, followed by a funnel rinse of 20.4 grams of PROGLYDE DMM. After about 98 minutes, the flask was warmed to 55° C. The isocyanate (NCO) equivalent weight was checked by titration every hour until it reached about 1655. Then 69.7 grams of 2,2-dimethylolpropionic acid was immediately added to the flask, followed by 42.1 grams of triethylamine and a rinse with 10.2 grams of PROGLYDE DMM. The contents of the flask were heated to 80° C. until the isocyanate peak at about 2265 cm-1 in the FTIR spectrum had disappeared. Then, 19.8 grams of trimellitic anhydride was added to the flask via a powder funnel. The contents of the flask were held at 80° C. until the anhydride peak at about 1790 cm-1 in the FTIR spectrum had disappeared. The milliequivalents (meq) of base was measured to be 0.186 (theory is 0.220, but some triethylamine is lost through the condenser during the reaction), so 24.0 grams of triethylamine was added to bring the theoretical % total neutralization to about 80%. The triethylamine was rinsed with 6.1 grams of PROGLYDE DMM. After stirring for about 15 minutes, 1747.8 grams of deionized water was added over 30 minutes. The contents of the flask were allowed to heat back to 80° C. (from about 65° C.) over 30 minutes. At 80° C., a mixture of 20.5 grams of LUPEROX 26 (available from Arkema (Colombes, France)) and 10.3 grams of PROGLYDE DMM were added to the flask over about 1 minute, followed by a rinse with 10.2 grams of PROGLYDE DMM. The contents of the flask were held for 1 hour, then cooled to 45° C. At 45° C., 17.7 grams of deionized water was added, and the contents were poured out after stirring for 3 minutes. The final polyurethane dispersion had a measured percent solids (110° C./1 hour) of about 35.4%, an meq acid of 0.207, an meq base of 0.153, a pH of 7.03 and a Brookfield viscosity (#1 spindle, 50 rpm, 25° C.) of about 103cp.

Examples 19 and 20

Preparation of Silver Basecoat (B2) Coating Compositions

Silver basecoat (B2) coating compositions were prepared by mixing the components shown in Table 13 below. Table 13 shows components in parts by weight.

TABLE 13

| Components | Comp. Example 19 | Example 20 |
| --- | --- | --- |
| Latex of Example 2 | 108.25 | 25.77 |
| Adipic Acid Dihydrazide[5] | 1.41 | 0.34 |
| Polyester Polymer of Example 4 | 49.32 | 102.74 |
| RESIMENE HM-2608[33] | — | 13.89 |
| Polyether Carbamate of Example 5 | 2.00 | 2.00 |
| Latex of Example 3 | 98.23 | 98.23 |
| Polyurethane Dispersion of Example 18 | 36.60 | 36.60 |
| BYK 348[6] | 0.23 | 0.23 |
| Odorless Mineral Spirits[26] | 6.38 | 6.38 |
| N-butoxypropanol[19] | 38.26 | 38.26 |
| 2-Ethylhexanol[27] | 5.54 | 5.54 |
| Deionized Water | 67.70 | 67.70 |
| LAPONITE RD[25] | 1.36 | 1.36 |
| TSB 2180A Al Paste[40] | 31.43 | 31.43 |
| Al passivation Agent | 10.11 | 10.11 |
| Total | 456.82 | 440.58 |

[40]Aluminum paste available from Toyal America, Inc. (Lockport, IL)

The mid-gray B1 and silver B2 were spray applied in an environment controlled to 70-75° F. (21° C.-24° C.) and 50-60% relative humidity onto 4 inch by 12 inch steel panels that were coated with PPG Electrocoat (ED-6465) commercially available from PPG Industries, Inc. (Pittsburgh, PA). The substrate panels were obtained from ACT Test Panels, LLC (Hillsdale, MI). The B1 was applied in one coat and then flashed at ambient temperature for 3 minutes. The film thickness was approximately 10-12 microns. The B2 was then applied wet-on-wet over the B1 in two coats, with a 60 second flash between coats, and then flashed at ambient temperature for 5 minutes and then dehydrated for 5 minutes at 80° C. The B2 film thickness was approximately 13-15 microns.

After forming the B1B2 layers, the 2K isocyanate clearcoat composition of Example B was applied over the basecoated panels in two coats without a flash between coats. The clearcoated panels were allowed to flash for 10 minutes at ambient condition and baked for 30 minutes at 80° C. The film thickness was approximately 45-50 microns.

Humidity resistance properties were tested on the coated panels. Higher values of adhesion are desirable. Both multi-layer coatings exhibited good adhesion and adhesion after humidity 24 hour recovery properties. The multi-layer coating including first and second crosslinker in the B2 layer additionally showed improved adhesion after humidity 1 hour recovery and blister after humidity properties.

TABLE 14

| Description | Adhesion[42] | Adhesion after Humidity-1 hr Recovery[41] | Adhesion after Humidity-24 hr Recovery[41] | Blisters after Humidity |
| --- | --- | --- | --- | --- |
| Mid-Gray B1 of Example 17/B2 Comp. Example 19 | 5 | 2 | 5 | Yes |

TABLE 14-continued

| Description | Adhesion[42] | Adhesion after Humidity-1 hr Recovery[41] | Adhesion after Humidity-24 hr Recovery[41] | Blisters after Humidity |
|---|---|---|---|---|
| Mid-Gray B1 of Example 17/B2 Example 20 | 5 | 5 | 5 | no |

[41]Ten day humidity resistance test similar to ASTM D1735-92, with adhesion tested after completion of the test at 1 hour and 24 hours, conducted in a Harshaw Equipment GS "Uni-Fog" corrosion test cabinet set at 100° F. (38° C.) and 100% relative humidity
[42]Adhesion test performed according to ASTM D3359

Examples 21-23

Preparation of Dark-Gray Basecoat (B1) Coating Compositions

Dark-gray basecoat (B1) coating compositions were prepared by mixing the components shown in Table 15 below. Table 15 shows components in parts by weight.

TABLE 15

| Components | Example 21 | Example 22 | Example 23 |
|---|---|---|---|
| Latex of Example 1 | 465.25 | 190.90 | 139.88 |
| Adipic Acid Dihydrazide[5] | 5.38 | 2.20 | 1.62 |
| Polyester Polymer of Example 16 | 134.73 | 73.21 | 112.59 |
| CARBODILITE V-02-L2[20] | 27.89 | 75.77 | — |
| BYK 348[6] | 0.70 | 0.38 | 0.35 |
| BYK 032[7] | 5.42 | 2.94 | 2.68 |
| DISPARLON AQH-800[43] | 27.89 | 15.15 | 13.81 |
| RESIMENE HM-2608[33] | — | — | 15.23 |
| Extender Tint[37] | 137.25 | 74.57 | 67.98 |
| White Tint[13] | 92.89 | 50.47 | 46.01 |
| Yellow Tint[38] | 22.64 | 12.30 | 11.21 |
| Black Tint[11] | 179.56 | 97.56 | 88.93 |
| BYKETOL WS[14] | 25.10 | 13.64 | 12.43 |
| SURFYNOL 104E[15] | 11.16 | 6.06 | 5.53 |
| Isopropanol[16] | 25.10 | 13.64 | 12.43 |
| TALCRON MP1052[17] | 11.16 | 6.06 | 5.53 |
| N-butoxypropanol[19] | 27.89 | 15.15 | 13.81 |
| Total | 1200.00 | 650.00 | 550.00 |

[43]Rheology control additive available from Kusumoto Chemicals, Ltd. (Tokyo, Japan)

Examples 24-26

Preparation of Black Basecoat (B2) Coating Compositions

Black basecoat (B2) coating compositions were prepared by mixing the components shown in Table 16 below. The tints from Examples 24 and 25 were prepared using a grind acrylic polymer according to the second polymer of the present invention (having carboxylic acid and hydroxyl functional groups) such that the second polymer was introduced into the coating composition via the tints. Table 16 shows components in parts by weight.

TABLE 16

| Components | Example 24 | Example 25 | Example 26 |
|---|---|---|---|
| Latex of Example 1 | 4835.47 | 305.03 | 238.65 |
| Adipic Acid Dihydrazide[5] | 55.86 | 3.58 | 2.78 |
| CARBODILITE V-02-L2[20] | 220.80 | 86.53 | — |
| Polyester Polymer of Example 4 | — | — | 194.06 |
| RESIMENE HM-2608[33] | — | — | 26.23 |
| Black Tint[44] | 996.78 | 85.02 | 103.38 |
| Red Tint[45] | 340.48 | 26.64 | 32.39 |
| BYK 348[6] | 9.27 | 0.76 | 0.92 |
| BYK 032[7] | 38.59 | 3.02 | 3.68 |
| BYKETOL WS[14] | 248.40 | 19.47 | 23.67 |
| SURFYNOL 104E[15] | 254.36 | 19.94 | 24.24 |
| Total | 7000.00 | 550.00 | 650.00 |

[44]Black tint paste consisting of 6.5% carbon black dispersed a resin blend of 8.6% acrylic resin (8.5% hydroxyethyl acrylate, 18.0% butyl methacrylate, 30.0% styrene, 35% butyl acrylate, 8.5% acrylic acid made at 27% solids), 7.2% acrylic-polyester-urethane resin (3.0% ethylene glycol dimethylacrylate, 11.0% methyl methacrylate, 24.0% butyl acrylate, 2.0% acrylic acid, and 60% polyester-acrylic-urethane (neopentyl glycol, adipic acid, and hydroxyethyl acrylate-butyl acrylate, 1,6-hexamethylene diisocyanate) made at 43.5% solids). The dispersion has a 25.4% weight solids content.
[45]Red tint paste consisting of 13% Cappoxyt Red 4435 dispersed in a resin blend of 7.3% acrylic resin (8.5% hydroxyethyl acrylate, 18.0% butyl methacrylate, 30.0% styrene, 35% butyl acrylate, 8.5% acrylic acid made at 27% solids), 5.9% acrylic-polyester-urethane resin (3.0% ethylene glycol dimethylacrylate, 11.0% methyl methacrylate, 9.0% butyl acrylate, 2.0% acrylic acid, and 75% polyester-acrylic-urethane (neopentyl glycol, adipic acid, and hydroxyethyl acrylate-butyl acrylate, 1,6-hexamethylene diisocyanate) made at 43.5% solids). The dispersion has a 27.6% weight solids content.

The dark-gray B1 and black B2 were spray applied in an environment controlled to 70-75° F. (21° C.-24° C.) and 50-60% relative humidity onto 4 inch by 12 inch steel panels that were coated with PPG Electrocoat (ED-6465) commercially available from PPG Industries, Inc. (Pittsburgh, PA). The substrate panels were obtained from ACT Test Panels, LLC (Hillsdale, MI). The B1 was applied in one coat and then flashed at ambient temperature for 1 minute. The film thickness was approximately 12-15 microns. The B2 was then applied wet-on-wet over the B1 in one coat and then flashed at ambient temperature for 5 minutes and then dehydrated for 5 minutes at 80° C. The B2 film thickness was approximately 12-15 microns.

After forming the B1B2 layers, the 2K isocyanate clearcoat composition of Example B was applied over the basecoated panels in two coats without a flash between coats. The clearcoated panels were allowed to flash for 10 minutes at ambient condition and baked for 30 minutes at 80° C. The film thickness was approximately 45-50 microns.

Humidity resistance properties were tested on the coated panels. Higher values in adhesion and no loss of adhesion after humidity testing are desirable. Viscosity stability is important for a paint to be a 1K paint. The B1 and B2 paints were put in a 40° C. hotroom for four weeks and the viscosity of the paints were monitored. Minimal viscosity change is preferred for a 1K paint. A gelled paint is not stable and is not desirable as a 1K paint.

TABLE 17

| Description | Adhesion[42] | Adhesion after Humidity-1 hr Recovery[41] | Initial Viscosity (cP) | Viscosity Stability[46] 4 Weeks 40° C. Hotroom Viscosity (cP) |
|---|---|---|---|---|
| Example 21 B1/ Example 24 B2 | 5 | 5 | B1 = 85 B2 = 107 | B1 = 80 B2 = gel |
| Example 22 B1/ | 5 | 5 | B1 = 85 | B1 = gel |

TABLE 17-continued

| Description | Adhesion[42] | Adhesion after Humidity-1 hr Recovery[41] | Viscosity Stability[46] | |
|---|---|---|---|---|
| | | | Initial Viscosity (cP) | 4 Weeks 40° C. Hotroom Viscosity (cP) |
| Example 25 B2 | | | B2 = 87 | B2 = gel |
| Example 23 B1/ Example 26 B2 | 5 | 5 | B1 = 87 B2 = 84 | B1 = 89 B2 = 117 |

[46]Viscosity measured with a Cap2000+ viscometer from Brookfield, 25° C., #4 spindle, 300 rpm The multi-layer coatings including the B1 and B2 layers in Examples 21-26 all showed good adhesion, adhesion after humidity 1 hour recover, and initial viscosity properties. The multi-layer coating using the B1 and B2 in Examples 23 and 26, respectively, showed improved 4 Weeks 40° C. hotroom viscosity indicating the benefit of a melamine crosslinker for 1K coating composition package stability.

Example 27

Preparation of Dark-Gray Basecoat (B1) Coating Composition

A dark-gray basecoat (B1) coating composition was prepared by mixing the components shown in Table 18 below. Table 18 shows components in parts by weight.

TABLE 18

| Components | Example 27 |
|---|---|
| Latex of Example 1 | 139.88 |
| Adipic Acid Dihydrazide[5] | 1.62 |
| Polyester Polymer of Example 16 | 112.59 |
| BYK 348[6] | 0.35 |
| BYK 032[7] | 2.68 |
| DISPARLON AQH-800[43] | 13.81 |
| RESIMENE HM-2608[33] | 15.23 |
| Extender Tint[37] | 67.98 |
| White Tint[13] | 46.01 |
| Yellow Tint[38] | 11.21 |
| Black Tint[11] | 88.93 |
| BYKETOL WS[14] | 12.43 |
| SURFYNOL 104E[15] | 5.53 |
| Isopropanol[16] | 12.43 |
| TALCRON MP1052[17] | 5.53 |
| N-butoxypropanol[19] | 13.81 |
| Total | 550.00 |

Example 28

Preparation of Black Basecoat (B2) Coating Composition

A black basecoat (B2) coating composition was prepared by mixing the components shown in Table 19 below. Table 19 shows components in parts by weight.

TABLE 19

| Components | Example 28 |
|---|---|
| Latex of Example 1 | 238.65 |
| Adipic Acid Dihydrazide[5] | 2.78 |
| Polyester Polymer of Example 4 | 194.06 |
| RESIMENE HM-2608[33] | 26.23 |
| Black Tint[44] | 103.38 |
| Red Tint[45] | 32.39 |
| BYK 348[6] | 0.92 |
| BYK 032[7] | 3.68 |
| BYKETOL WS[14] | 23.67 |
| SURFYNOL 104E[15] | 24.24 |
| Total | 650.00 |

The dark-gray B1 and black B2 were spray applied in an environment controlled to 70-75° F. (21° C.-24° C.) and 50-60% relative humidity onto 4 inch by 12 inch steel panels that were coated with PPG Electrocoat (ED-6465) commercially available from PPG Industries, Inc. (Pittsburgh, PA). The substrate panels were obtained from ACT Test Panels, LLC (Hillsdale, MI). B1 was applied in one coat and then flashed at ambient temperature for 5 minutes 25 seconds. The film thickness was approximately 17-20 microns. The B2 was then applied wet-on-wet over the B1 in two coats with 100 seconds between coats and then flashed at ambient temperature for 5 minutes 25 seconds and then dehydrated for 7 minutes at 70° C. The B2 film thickness was approximately 13-15 microns.

After forming the B1B2 layers, the 2K isocyanate clearcoat composition of Example B was applied over the basecoated panels in two coats with a 50 second flash between coats. The clearcoated panels were allowed to flash for 7 minutes 30 seconds at ambient condition and baked for 30 minutes at 140° C. The film thickness was approximately 50-55 microns.

The panels were sent to Ft. Lauderdale for etch exposure for 14 weeks from May to August. After the 14 weeks the panels were given an etch rating and put back on exposure for 5 years durability testing.

TABLE 20

| Description | Melamine Content | Bake Temp | Gloss[47] | DOI[48] | Adhesion[42] | Adhesion after Humidity-1 hr Recovery[41] | Etch Rating[49] |
|---|---|---|---|---|---|---|---|
| Example 27 B1/ Example 28 B2 | B1 = 2.77% B2 = 4.04% | 80° C. | 87 | 95 | 5 | 5 | 3 |

[47]As measured using a Byk Gardner Micro Tri Gloss instrument at 20° Gloss
[48]As measured using a DOI/Haze meter Model 807A from Tricor Systems Inc. (Elgin, IL)
[49]Determined by a visual rating for etch spotting marks with 1 = best and 10 = worst The dark gray/black multi-layer coating showed good results for each of the properties listed in Table 20.

Example 29

Preparation of a Light-Gray Basecoat (B1) Coating Composition

A light-gray basecoat (B1) coating composition was prepared by mixing the components shown in Table 21 below. Table 21 shows components in parts by weight.

TABLE 21

| Components | Example 29 |
|---|---|
| Latex of Example 1 | 101.03 |
| Adipic Acid Dihydrazide[5] | 1.17 |
| Polyester Polymer of Example 4 | 81.73 |
| BYK 348[6] | 0.42 |
| BYK 032[7] | 1.75 |
| TINUVIN 1130[50] | 2.60 |
| RESIMENE HM-2608[33] | 11.00 |
| White Tint[13] | 222.14 |
| Yellow Tint[38] | 0.98 |
| Black Tint[11] | 1.73 |

TABLE 21-continued

| Components | Example 29 |
|---|---|
| BYKETOL WS[14] | 11.25 |
| SURFYNOL 104E[15] | 11.52 |
| N-butoxypropanol[19] | 10.00 |
| Total | 456.95 |

[50]UV absorber available from BASF (Ludwigshafen, Germany)

Example 30

Preparation of a White Basecoat (B2) Coating Composition

A white basecoat (B2) coating composition was prepared by mixing the components shown in Table 22 below. Table 22 shows components in parts by weight.

TABLE 22

| Components | Example 30 |
|---|---|
| Latex of Example 1 | 101.29 |
| Adipic Acid Dihydrazide[5] | 1.17 |
| Polyester Polymer of Example 4 | 81.62 |
| BYK 348[6] | 0.42 |
| BYK 032[7] | 1.75 |
| TINUVIN 1130[50] | 2.60 |
| RESIMENE HM-2608[33] | 11.03 |
| White Tint[13] | 222.14 |

TABLE 22-continued

| Components | Example 30 |
|---|---|
| Yellow Tint[38] | 0.98 |
| Black Tint[11] | 0.57 |
| BYKETOL WS[14] | 11.25 |
| SURFYNOL 104E[15] | 11.52 |

The light-gray B1 and white B2 were spray applied in an environment controlled to 70-75° F. (21° C.-24° C.) and 50-60% relative humidity onto 4 inch by 12 inch steel panels that were coated with PPG Electrocoat (ED-6465) commercially available from PPG Industries, Inc. (Pittsburgh, PA). The substrate panels were obtained from ACT Test Panels, LLC (Hillsdale, MI). B1 was applied in one coat and then flashed at ambient temperature. The B2 was then applied wet-on-wet over the B1 in two coats After forming the B1B2 layers, the 2K isocyanate clearcoat of Example B was applied over the basecoated panels in two coats with a flash between coats. The clearcoated panels were allowed to flash at ambient condition and baked for 30 minutes at 140° C.

TABLE 23

| Description | Melamine Content | Bake Temp | Hardness[32] | Gloss[47] | DOI[48] | Adhesion[42] | Adhesion after Humidity- 1 hr Recovery[41] |
|---|---|---|---|---|---|---|---|
| Example 29 B1/ Example 30 B2 | B1 = 11.0% B2 = 11.03% | 80° C. | 98 | 89 | 93 | 5 | 5 |

The light gray/white multi-layer coating showed good results for each of the properties listed in Table 23 at 80° C. bake temperature.

Whereas particular embodiments of this invention have been described above for purposes of illustration, it will be evident to those skilled in the art that numerous variations of the details of the present invention may be made without departing from the invention as defined in the appended claims.

The invention claimed is:

1. A coating composition, comprising:
an aqueous medium;
a first polymer comprising first core-shell particles dispersed in the aqueous medium, wherein the first core-shell particles comprise (i) keto and/or aldo functional groups, (ii) a polymeric shell comprising carboxylic acid functional groups and urethane and/or urea linkages, and (iii) a polymeric core at least partially encapsulated by the polymeric shell, wherein the polymeric shell and/or the polymeric core comprise the keto and/or aldo functional groups;
a second polymer dispersed in the aqueous medium, the second polymer comprising (i) a polyester polymer comprising carboxylic acid functional groups, and (ii) second core-shell particles, wherein the second core-shell particles are different from the first core-shell particles and comprise (a) a polymeric shell comprising carboxylic acid functional groups and (b) a polymeric core at least partially encapsulated by the polymeric shell, wherein the polymeric shell and/or the polymeric core comprise hydroxyl functional groups;
a first crosslinker comprising a polyhydrazide reactive with the first core-shell particles; and
a second crosslinker reactive with the first core-shell particles and/or the second polymer,
wherein the polymeric core of the first core-shell particles are covalently bonded to at least a portion of the corresponding polymeric shell.

2. The coating composition of claim 1, wherein the polymeric core and polymeric shell of the second core-shell particles comprise an addition polymer derived from ethylenically unsaturated monomers, and
wherein the addition polymer comprises hydroxyl functional groups and carboxylic acid functional groups.

3. The coating composition of claim 2, wherein the addition polymer of the polymeric core is crosslinked.

4. The coating composition of claim 1, wherein the polymeric core of the second core-shell particles is free of carboxylic acid functional groups.

5. The coating composition of claim 1, wherein the keto and/or aldo functional groups of the first core-shell particles are formed on the polymeric shell.

6. The coating composition of claim 5, wherein the first core-shell particles are obtained from reactants comprising:
a polyurethane prepolymer comprising an isocyanate functional group, an ethylenically unsaturated group, and carboxylic acid functional groups;
ethylenically unsaturated monomers different from the polyurethane prepolymer; and
a Michael Addition reaction product of ethylenically unsaturated monomers comprising a keto and/or aldo functional group, and a compound comprising at least two amino groups.

7. The coating composition of claim 1, wherein the keto and/or aldo functional groups of the first core-shell particles are formed on the polymeric core.

8. The coating composition of claim 7, wherein the first core-shell particles are obtained from reactants comprising:
ethylenically unsaturated monomers, wherein at least one of the ethylenically unsaturated monomers comprises keto and/or aldo functional groups; and
a polyurethane prepolymer comprising an isocyanate functional group, an ethylenically unsaturated group, and carboxylic acid functional groups.

9. The coating composition of claim 1, wherein the polyhydrazide comprises a non-polymeric polyhydrazide, a polymeric polyhydrazide, or a combination thereof.

10. The coating composition of claim 9, wherein the polymeric polyhydrazide comprises a polyurethane comprising at least two hydrazide functional groups.

11. The coating composition of claim 9, wherein the polymeric polyhydrazide comprises core-shell particles comprising (1) a polymeric core at least partially encapsulated by (2) a polymeric shell comprising hydrazide functional groups, wherein the polymeric core is covalently bonded to at least a portion of the polymeric shell.

12. The coating composition of claim 11, wherein the polymeric polyhydrazide core-shell particles are obtained from reactants comprising:
a polyurethane prepolymer comprising an isocyanate functional group and an ethylenically unsaturated group;
hydrazine and/or non-polymeric polyhydrazides; and
ethylenically unsaturated monomers different from the polyurethane prepolymer and the hydrazine and/or non-polymeric polyhydrazides.

13. The coating composition of claim 1, wherein a weight ratio of the first polymer to the second polymer is from 1:1 to 5:1.

14. The coating composition of claim 1, wherein the second crosslinker comprises a carbodiimide, an aminoplast, and/or an oxazoline.

15. The coating composition of claim 1, further comprising a non-core-shell particle hydroxyl functional film-forming resin.

16. A substrate at least partially coated with a coating formed from the coating composition of claim 1.

17. A multi-layer coating, comprising:
a first basecoat layer applied over at least a portion of a substrate which is formed from a first basecoat composition; and
a second basecoat layer applied over at least a portion of the first basecoat composition and which is formed from a second basecoat composition,
wherein the first basecoat composition and/or the second basecoat composition comprises the coating composition of claim 1.

18. The multi-layer coating of claim 17, further comprising:
a primer coating layer directly applied over at least a portion of the substrate, such that the primer coating layer is positioned between the first basecoat layer and the substrate; and/or
a topcoat layer applied over at least a portion of the first or second basecoat layer.

19. A coating composition, comprising:
an aqueous medium;
a first polymer comprising first core-shell particles dispersed in the aqueous medium, wherein the first core-shell particles comprise (i) keto and/or aldo functional groups, (ii) a polymeric shell comprising carboxylic acid functional groups and urethane and/or urea linkages, and (iii) a polymeric core at least partially encapsulated by the polymeric shell, wherein the polymeric shell and/or the polymeric core comprise the keto and/or aldo functional groups;
a second polymer dispersed in the aqueous medium, the second polymer comprising second core-shell particles comprising carboxylic acid functional groups and hydroxyl functional groups;
a first crosslinker comprising a polymeric polyhydrazide reactive with the first core-shell particles, wherein the polymeric polyhydrazide comprises a polyurethane comprising at least two hydrazide functional groups; and
a second crosslinker reactive with the first core-shell particles and/or the second polymer,
wherein the polymeric core of the first core-shell particles are covalently bonded to at least a portion of the corresponding polymeric shell.

* * * * *